United States Patent
Yong et al.

(10) Patent No.: US 11,921,519 B2
(45) Date of Patent: Mar. 5, 2024

(54) PARTITION-BASED PARAMETRIC ACTIVE MODEL DISCRIMINATION WITH APPLICATIONS TO DRIVER INTENTION ESTIMATION

(71) Applicant: Arizona Board of Regents on Behalf of Arizona State University, Scottsdale, AZ (US)

(72) Inventors: Sze Zheng Yong, Mesa, AZ (US); Ruochen Niu, Tempe, AZ (US); Qiang Shen, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 459 days.

(21) Appl. No.: 16/449,832

(22) Filed: Jun. 24, 2019

(65) Prior Publication Data
US 2020/0401161 A1  Dec. 24, 2020

(51) Int. Cl.
| | | |
|---|---|---|
| *G06F 17/00* | (2019.01) | |
| *B60W 40/105* | (2012.01) | |
| *B60W 40/107* | (2012.01) | |
| *G05D 1/00* | (2006.01) | |

(52) U.S. Cl.
CPC ......... *G05D 1/0295* (2013.01); *B60W 40/105* (2013.01); *B60W 40/107* (2013.01)

(58) Field of Classification Search
CPC  G05D 1/0295; B60W 40/105; B60W 40/107; B60W 30/143; B60W 40/04; B60W 30/0956; B60W 2554/4045; G08G 1/167
USPC ......................................................... 701/96
See application file for complete search history.

(56) References Cited

U.S. PATENT DOCUMENTS

| | | | |
|---|---|---|---|
| 8,903,588 B2 * | 12/2014 | Schmudderich | G06V 20/58 701/96 |
| 9,443,153 B1 | 9/2016 | Gupta | |
| 9,550,528 B1 * | 1/2017 | Hakeem | B62D 15/025 |
| 9,827,985 B2 * | 11/2017 | Yoo | B60W 30/09 |
| 9,977,430 B2 | 5/2018 | Shalev-Shwartz | |
| 10,469,146 B1 * | 11/2019 | Ekbatani | H04B 7/0632 |

(Continued)

OTHER PUBLICATIONS

Ding, Y. et al. Optimal input design for affine model discrimination with applications in intention-aware vehicles. In ACM/IEEE ICCPS, pp. 5161-5167 (Year: 2018).*

(Continued)

*Primary Examiner* — Ronnie M Mancho
(74) *Attorney, Agent, or Firm* — Quarles & Brady, LLP

(57) ABSTRACT

A method estimates an intention of a lead vehicle by an ego vehicle. The method includes: (a) receiving, from at least one of a first plurality of sensors coupled to the ego vehicle, information associated with a parametric variable, (b) selecting a partition of an operating region of the parametric variable based on the parametric variable information, wherein the operating region includes a predetermined range of values for the parametric variable, wherein the partition includes a subset of the predetermined range of values and being associated with a predetermined ego vehicle input, and wherein the predetermined vehicle input includes at least one value for a parameter corresponding to dynamics of the ego vehicle, and (c) causing a vehicle control system of the ego vehicle to perform a vehicle maneuver based on the predetermined ego vehicle input.

20 Claims, 8 Drawing Sheets

(56) References Cited

U.S. PATENT DOCUMENTS

| | | | |
|---|---|---|---|
| 10,814,876 B2* | 10/2020 | Liu | G05D 1/0088 |
| 11,110,917 B2* | 9/2021 | Stimpson | B60W 30/09 |
| 11,242,059 B2* | 2/2022 | Ozay | B60W 30/0956 |
| 11,247,675 B2* | 2/2022 | Wu | B60W 30/16 |
| 11,440,543 B2* | 9/2022 | Ozay | B60W 50/02 |
| 2016/0144859 A1* | 5/2016 | Yoo | B60W 30/09 701/25 |
| 2017/0106857 A1* | 4/2017 | Nasser | B60W 30/09 |
| 2017/0291608 A1* | 10/2017 | Engel | G08G 1/161 |
| 2018/0074505 A1* | 3/2018 | Lv | G05D 1/0289 |
| 2018/0260635 A1 | 9/2018 | Al-Dahle | |
| 2019/0193737 A1* | 6/2019 | Likhachev | B60W 60/00274 |
| 2019/0202462 A1* | 7/2019 | Wu | B60W 40/105 |
| 2019/0270453 A1* | 9/2019 | Katsura | B60W 30/18154 |
| 2020/0189580 A1* | 6/2020 | Schmidt | B60W 30/18163 |
| 2020/0238987 A1* | 7/2020 | Ozay | G01S 17/931 |
| 2020/0298859 A1* | 9/2020 | Ozay | B60W 30/0956 |
| 2020/0339123 A1* | 10/2020 | Ozay | B60W 30/18163 |
| 2020/0401161 A1* | 12/2020 | Yong | G08G 1/167 |
| 2021/0012593 A1* | 1/2021 | Hassaan | G06F 16/215 |
| 2022/0092987 A1* | 3/2022 | Oboril | B60W 40/09 |

OTHER PUBLICATIONS

Optimal Input Design for Affine Model Discrimination with Applications in Intention-Aware Vehicles (Year: 2018).*

Bertsimas D. et al. Finite adaptability in multistage linear optimization. IEEE Transactions on Automatic Control, 55(12):2751-2766, 2010.

Bertsimas, D. et al. Theory and applications of robust optimization. SIAM review, 53(3):464-501, 2011.

Cheong S. et al. Input design for discrimination between classes of LTI models. Automatica, 53:103-110, Mar. 2015.

Dadigh, D. et al. Information gathering actions over human internal state. In IEEE/RSI IROS, pp. 66-73, Oct. 2016.

Ding, Y. et al. Optimal input design for affine model discrimination with applications in intention-aware vehicles. In ACM/IEEE ICCPS, pp. 5161-5167, 2018.

Gurobi Optimization, Inc. Gurobi optimizer reference manual, 2015.

Harirchi, F. et al. Active model discrimination with applications to fraud detection in smart buildings. In IFAC World Congress, 2017.

Harirchi, F. et al. Passive diagnosis of hidden-mode switched affine models with detection guarantees via model invalidation. In Diagnosability, Security and Safety of Hybrid Dynamic and Cyber-Physical Systems, pp. 227-251. Springer, 2018.

IBM ILOG CPLEX. V12. 1: User's manual for CPLEX. International Business Machines Corporation, 46(53):157, 2009.

Kvasnica, M. et al. Multi-Parametric Toolbox (MPT), 2004.

Lidstrom "Model-Based Estimation of Driver Intentions Using Particle Filtering," 11th International IEEE Conference on Intelligent Transportation Systems, 2008.

Lou H. et al. The distinguishability of linear control systems. Nonlinear Analysis: Hybrid System, 3(1):21-39, Nov. 2009.

Marseglia G. R. et al. Active fault diagnosis: A multi-parametric approach. Automatica, 79:223-230, May 2017.

Nikoukhah R. et al. Auxiliary signal design for active failure detection in uncertain linear systems with a priori information. Automatica, 42(2):219-228, Feb. 2006.

Raimondo, D. M. et al. Closed-loop input design for guaranteed fault diagnosis using setvalued observers. Automatica, 74:107-117, Dec. 2016.

Schulz "Estimation of Collective Maneuvers through Cooperative Multi-Agent Planning," IEEE Intelligent Vehicles Symposium (IV), 2017.

Scott, J. K. et al. Input design for guaranteed fault diagnosis using zonotopes. Automatica, 50(6):1580-1589, Jun. 2014.

Venkatasubramanian, V. et al. A review of process fault detection and diagnosis: Part I: Quantitative model-based methods. Comp. & Chem. Eng., 27(3):293-311, Mar. 2003.

Yong, S. Z. et al. Generalized innovation and inference algorithms for hidden mode switched linear stochastic systems with unknown inputs. In IEEE CDC, pp. 3388-3394, Dec. 2014.

U.S. Appl. No. 16/925,216, filed Jul. 9, 2020, Hassan et al.

U.S. Appl. No. 16/925,232, filed Jul. 9, 2020, Shen et al.

* cited by examiner

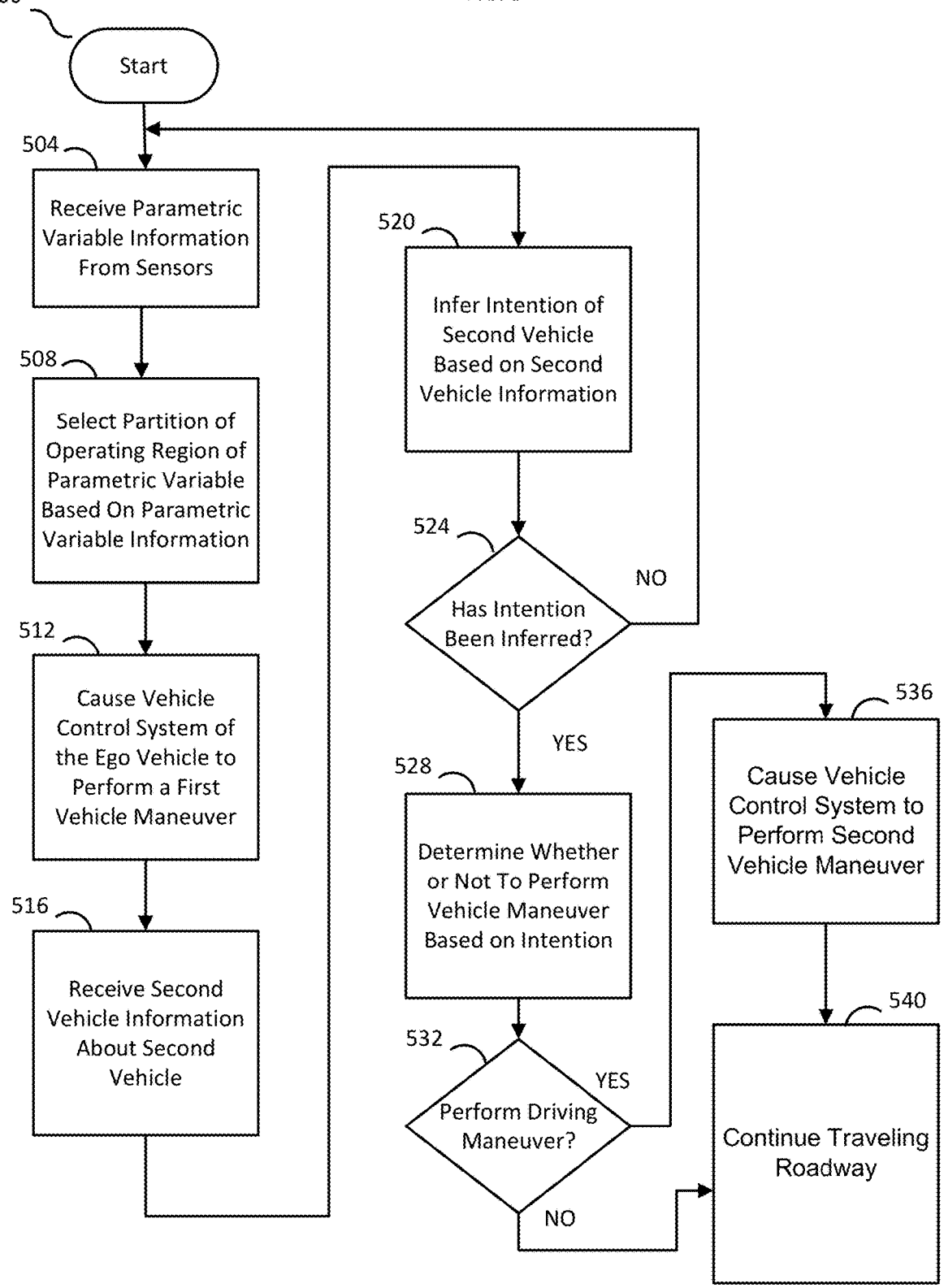

PARTITION-BASED PARAMETRIC ACTIVE MODEL DISCRIMINATION WITH APPLICATIONS TO DRIVER INTENTION ESTIMATION

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to intention estimation of vehicles by an ego vehicle.

2. Description of the Related Art

Cyber-physical systems (CPS), such as the power grid, autonomous driving, aerospace system, are ubiquitous and have a big influence on our daily life. However, the often complex CPS are inevitably interconnected with other systems, whose models and behavior patterns such as intention, are not accessible or only partially known, making it non-trivial to provide safety guarantees. For example, some autonomous vehicles operate and make decisions such as collision avoidance without the knowledge of the intentions of surrounding drivers or pedestrians.

Similarly, it is of great interest to rapidly and accurately determine from noisy measurements whether a system malfunction or faults have occurred and which components have failed. These are broadly studied in the field of statistics, machine learning and systems theory. While approaches for model discrimination, including automated fault diagnosis and intention identification exist, these approaches may involve complex calculations that can take up valuable time when being executed, which can be adverse to allowing implementation in an autonomous or semi-autonomous vehicle.

Therefore, what is needed is an improved method for estimating an intention of a lead vehicle by an ego vehicle.

SUMMARY OF THE INVENTION

The present disclosure provides a method of estimating an intention of a lead vehicle using parametric variable values and other sensor measurements sensed online during operation of the ego vehicle and predetermined partitions of an operating region of the parametric variable to choose the sequence of optimal separating inputs.

In one aspect, a method in a data processing system including at least one processor and at least one memory, the at least one memory including instructions executed by the at least one processor to implement a vehicle monitoring system is disclosed. The method includes receiving, from at least one of a first plurality of sensors coupled to the ego vehicle, information associated with a parametric variable, selecting a partition of an operating region of the parametric variable based on the parametric variable information, the operating region including a predetermined range of values for the parametric variable, the partition including a subset of the predetermined range of values and being associated with a predetermined ego vehicle input, and the predetermined vehicle input including at least one value for a parameter corresponding to dynamics of the ego vehicle, and causing a vehicle control system of the ego vehicle to perform a vehicle maneuver based on the predetermined ego vehicle input.

The method may further include receiving, from at least one of a second plurality of sensors coupled to an ego vehicle, first vehicle information about a second vehicle, inferring an intention of the second vehicle based on the first vehicle information, and causing the vehicle control system to perform a second vehicle maneuver based on the intention.

In the method, the intention may be included in a set of intentions, and each intention in the set of intentions may be associated with a second vehicle operating parameter of the second vehicle and a predetermined intention model value of the second vehicle operating parameter, and the predetermined intention model value may be previously calculated to differ by a predetermined threshold for each intention in the set of intentions. In the method, the first vehicle information may include information about a second vehicle operating parameter value of the second vehicle operating parameter, and the intention may be inferred based on the second vehicle operation parameter value and the predetermined intention model value. In the method, the second vehicle operating parameter may be a longitudinal velocity of the second vehicle.

In the method, the predetermined ego vehicle input can be previously calculated to minimize a maximum input magnitude of the predetermined ego vehicle input.

In the method, the predetermined vehicle input may belong to a plurality of predetermined vehicle inputs, each predetermined vehicle input corresponding a discrete time point included in a series of time points and including at least one value, and each predetermined vehicle input may have been previously calculated to minimize a sum of the values in the plurality of predetermined vehicle inputs.

In the method, the predetermined ego vehicle input may include a longitudinal acceleration value and a lateral velocity value.

The method may further include receiving, from the first plurality of sensors, second parametric variable information associated with the parametric variable, the parametric variable information and the second parametric variable information being associated with different discrete time points, selecting a second partition of the operating region based on the second parametric variable information, the partition being associated with a second predetermined ego vehicle input, and causing the vehicle control system to perform a second vehicle maneuver based on the second predetermined ego vehicle input. In the method, the second partition may include a second subset of the predetermined range of values of the partition, and the second subset may be equivalent to the subset of the partition.

In another aspect, a method in a data processing system including at least one processor and at least one memory, the at least one memory including instructions executed by the at least one processor to implement a vehicle monitoring system is disclosed. The method includes receiving, from a first plurality of sensors coupled to the ego vehicle, parametric variable information associated with a parametric variable, selecting a predetermined ego vehicle input based on the parametric variable information, causing a vehicle control system of the ego vehicle to perform a first vehicle maneuver based on the predetermined ego vehicle input, the predetermined vehicle input including at least one value for a parameter corresponding to dynamics of the ego vehicle, receiving, from a second plurality of sensors coupled to the ego vehicle, second vehicle information about a second vehicle, inferring an intention of the second vehicle based on the second vehicle information, and causing the vehicle control system to perform a second vehicle maneuver based on the intention.

The method may further include receiving, from the first plurality of sensors, second parametric variable information associated with the parametric variable, the parametric variable information and the second parametric variable information being associated with different discrete time points, selecting a partition of the operating region based on the second parametric variable information, the partition being associated with a second predetermined ego vehicle input, and causing the vehicle control system to perform third vehicle maneuver based on the second predetermined ego vehicle input.

In the method, the parametric variable may be a desired longitudinal velocity.

The method may further include selecting a partition of an operating region of the parametric variable based on the desired longitudinal velocity value, the operating region including a predetermined range of values for the parametric variable, and the partition including a subset of the predetermined range of values and being associated with a predetermined ego vehicle input.

In the method, the parametric variable may be one of a weight of the ego vehicle, a road gradient of a road in contact with the ego vehicle, a friction coefficient of tires coupled to the ego vehicle, a steering input value, or a location of an object located near the road.

In the method, the predetermined ego vehicle input may include at least one of a predetermined velocity of the ego vehicle and a predetermined position of a pair of front wheels of the ego vehicle.

In yet another aspect, a driving control system for an ego vehicle, the driving control system is disclosed. The driving control system include a plurality of sensors coupled to the ego vehicle, the ego vehicle including a vehicle control system, and a controller in electrical communication with the plurality of sensors and the vehicle control system, the controller being configured to execute a program to receive, from at least one of the first plurality of sensors coupled to the ego vehicle, information associated with a parametric variable, select a partition of an operating region of the parametric variable based on the parametric variable information, the operating region including a predetermined range of values for the parametric variable, the partition including a subset of the predetermined range of values and being associated with a predetermined ego vehicle input, and the predetermined vehicle input including at least one value for a parameter corresponding to dynamics of the ego vehicle; and cause a vehicle control system of the ego vehicle to perform a vehicle maneuver based on the predetermined ego vehicle input.

The system may further include a second plurality of sensors coupled to the ego vehicle, and wherein the controller is further configured to execute the program to receive, from at least one of a second plurality of sensors coupled to an ego vehicle, second vehicle information about a second vehicle infer an intention of the second vehicle based on the second vehicle information, and cause the vehicle control system to perform a second vehicle maneuver based on the intention. The intention may be included in a set of intentions, and each intention in the set of intentions may be associated with a second vehicle operating parameter, and a second vehicle operating parameter value of the second vehicle operating parameter may have been previously calculated to differ by a predetermined threshold for each intention in the set of intentions.

In the system, the controller may be further configured to execute the program to receive, from at least one of the first plurality of sensors, second parametric variable information associated with the parametric variable, the parametric variable information and the second parametric variable information being associated with different discrete time points, select a second partition of the operating region based on the second parametric variable information, the partition being associated with a second predetermined ego vehicle input; and cause the vehicle control system to perform a second vehicle maneuver based on the second predetermined ego vehicle input.

These and other features, aspects, and advantages of the present invention will become better understood upon consideration of the following detailed description, drawings and appended claims.

BRIEF DESCRIPTION OF THE DRAWINGS

FIG. 5 shows an exemplary embodiment of a process for implementing a vehicle monitoring system for causing an ego vehicle to perform a vehicle maneuver based on predetermined vehicle input values as well as detecting an intention of a second vehicle.

DETAILED DESCRIPTION OF THE INVENTION

Figure 1:
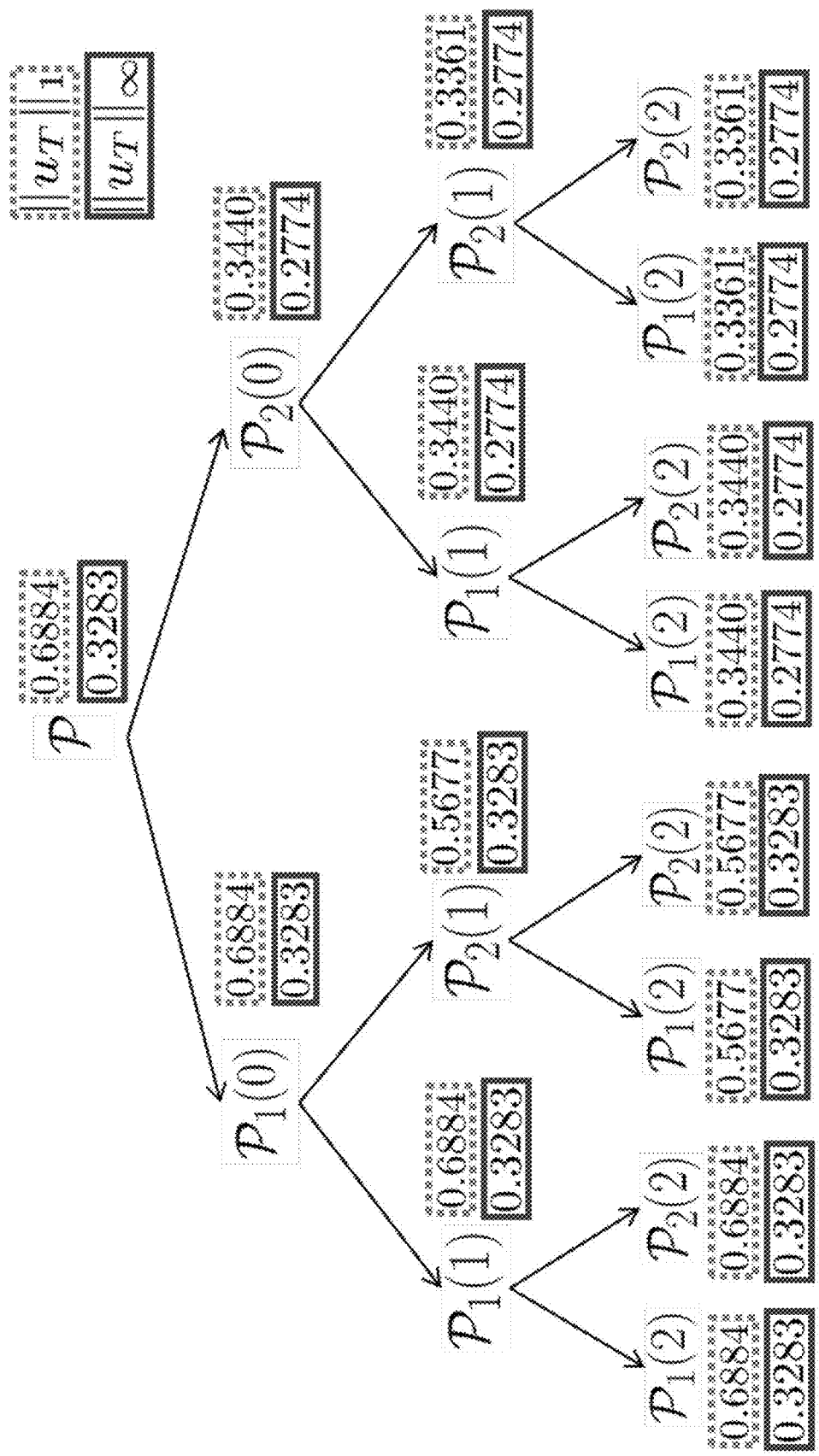
FIG. 1 shows a partition tree for the model-independent parameter p over a fixed horizon T=3.

Elements of this disclosure can provide new consumer protections by providing an intention determination system for determining an intention of a second vehicle by an ego vehicle.

In this disclosure, we propose a partition-based parametric active model discrimination approach for designing optimal input sequences that distinguish a set of discrete-time affine time-invariant models with uncontrolled inputs, model-independent parameters and noises over a fixed horizon, where the parameters are revealed in real-time. By partitioning the operating region of the parameters, the input design problem is formulated as a sequence of offline optimization problems. Thus, at each time instant, one only needs to determine which subregions in the resulting partition tree that the revealed parameters lie in and select the corresponding pre-computed inputs. The offline optimal input design problem is formulated as a bilevel problem and further cast as a mixed-integer linear program. Finally, we demonstrate the effectiveness of the proposed active model discrimination approach for identifying the intention of other vehicles in a lane changing scenario.

Introduction

Cyber-physical systems (CPS), such as the power grid, autonomous driving, aerospace system, are ubiquitous and have a big influence on our daily life. However, the often complex CPS are inevitably interconnected with other systems, whose models and behavior patterns such as intention, are not accessible or only partially known, making it non-trivial to provide safety guarantees. For example, some autonomous vehicles operate and make decisions such as collision avoidance without the knowledge of the intentions of surrounding drivers or pedestrians (Refs. 1,2). Similarly, it is of great interest to rapidly and accurately determine from noisy measurements whether a system malfunction or faults have occurred and which components have failed. These are broadly studied in the field of statistics, machine learning and systems theory. Approaches for model discrimination, including automated fault diagnosis and intention identification, can be categorized into passive and active methods. Passive approaches, which are more broadly studied, compare collected input-output data in real time with existing data to separate models regardless of the input (Ref. (3), Ref. (4), Ref. (5)). By contrast, active methods, also known as active model discrimination, exert a minimal signal or input into the system to ensure that the behaviors of all models are distinct and discriminated from each other (Ref. (6), Ref. (7), Ref. (8), Ref. (9)), using various techniques ranging from polyhedral projection (Ref. (7)) to a mixed-integer linear program (MILP) (Ref. (8), Ref. (9)).

Furthermore, closed-loop approaches that consider online measurements have been studied in Ref. (10), Ref. (11) in order to reduce the input cost and time needed for model discrimination. In Ref. (11), a multi-parametric method that moves most of the computation offline is proposed, while in Ref. (10), a partition-based method, similar to the one we are proposing, is considered. Both approaches Ref. (10), Ref. (11) use an explicit set representation of the reachable states in the form of zonotopes and additionally require the design of a set-valued observer in a moving horizon fashion. To our knowledge, this approach does not directly apply when there are time-varying parameters that are revealed in real time, as in multistage optimization problems, e.g., Ref. (12), and when the time horizon is fixed, as is the case we are addressing.

This disclosure presents a partition-based parametric approach for active model discrimination amongst a set of discrete-time affine time-invariant models with common model-independent parameters that are only known or revealed in real time. These time-varying parameters can represent real-time information such as varying road gradients or reference outputs. By leveraging the additional information from the revealed parameters, the "adaptive" separating input will lead to improved performance (i.e., lower input cost) when compared to an open-loop approach that does not take this information into account (cf. Ref. (9), Ref. (13)). Since solving the active model discrimination problem in real time is computationally demanding, we propose to move this active model discrimination problem offline, by solving them as a function of the parameters (as parametric variables), i.e., as a parametric active model discrimination problem. To further alleviate the computational burden, we consider partitions of the operating regions of the parameters. We formulate the parametric active model discrimination problem as a sequence of offline optimization problems, each of which can be cast as a bilevel problem and converted to a tractable mixed-integer linear program (MILP) with Special Ordered Set of degree 1 (SOS-1) constraints. Comparing with existing approaches Ref. (7), Ref. (10), our approach uses an implicit set representation of the states, in contrast to the rather limiting explicit set representation, e.g., polyhedrons and zonotopes in Ref. (7), Ref. (10), respectively. Moreover, our formulation applies to a more general class of affine models with uncontrolled inputs and model-independent parameters beyond the classes of models considered in Ref. (7), Ref. (8), Ref. (10). Finally, we illustrate the effectiveness of the proposed partition-based parametric active model discrimination approach to discriminate amongst the intentions of other human-driven or autonomous vehicles in a lane changing scenario.

Preliminaries

In this section, we introduce some notations and definitions, and describe the modeling framework we consider.

A. Notation and Definitions

Let $x \in \mathbb{R}^n$ denote a vector and $M \in \mathbb{R}^{n \times m}$ a matrix, with transpose $M^T$ and $M \geq 0$ denotes element-wise non-negativity. The vector norm of x is denoted by $\|x\|_i$ with $i \in \{1, 2, \infty\}$, while $O$, $\mathbb{1}$ and $\mathbb{I}$ represent the vector of zeros, the vector of ones and the identity matrix of appropriate dimensions. The diag and vec operators are defined for a collection of matrices $M_i$, $i=1, \ldots, n$ and matrix $$diag_{k=i}^{j}\{M_k\} = \begin{bmatrix} M_i & & \\ & \ddots & \\ & & M_j \end{bmatrix}, \quad vec_{k=i}^{j}\{M_k\} = \begin{bmatrix} M_i \\ \vdots \\ M_j \end{bmatrix},$$

$$diag_{i,j}\{M_k\} = \begin{bmatrix} M_i & O \\ O & M_j \end{bmatrix}, \quad vec_{i,j}\{M_k\} = \begin{bmatrix} M_i \\ M_j \end{bmatrix},$$

$$diag_N\{M\} = \mathbb{I}_N \otimes M, \quad vec_N\{M\} = \mathbb{1}_N \otimes M,$$

where $\otimes$ is the Kronecker product. The set of positive integers up to n is denoted by $\mathbb{Z}_n^+$, and the set of non-negative integers up to n is denoted by $\mathbb{Z}_n^0$. In addition, the set of non-negative integers from $j_1$ to $j_2$ ($0 \leq j_1 \leq j_2$) is denoted by $\mathbb{Z}_{j_2}^{j_1}$.

Definition 1 (SOS-1 Constraints Ref. (14)). A special ordered set of degree 1 (SOS-1) constraint[1] is a set of integer, continuous or mixed-integer scalar variables for which at most one variable in the set may take a value other than zero, denoted as SOS-1: $\{v_1, \ldots, v_N\}$. For instance, if $v_i \neq 0$, then this constraint imposes that $v_j = 0$ for all $j \neq i$.

Definition 2 (Partition). A partition of a polyhedral set $\mathcal{P}$ is a collection of $|S|$ disjoint subsets $\mathcal{P}_{\bar{p}}$ such that $$\bigcup_{\bar{p} \in S} \mathcal{P}_{\bar{p}} = \mathcal{P},$$

where each partition $\mathcal{P}_{\bar{p}}$ is also a polyhedral set.

B. Modeling Framework

Consider N discrete-time parametric affine time-invariant models $\mathcal{G}_i = (A_i, B_i, B_{w,i}, C_i, f_i, g_i)$, each with states $\vec{x}_i \in \mathbb{R}^n$, outputs $z_i \in \mathbb{R}^{n_z}$, inputs $\vec{u} \in \mathbb{R}^m$, process noise $w_i \in \mathbb{R}^{m_w}$, measurement noise $v_i \in \mathbb{R}^{m_v}$ and a common model-independent parameter $p(k) \in \mathbb{R}^{m_p}$ that is only known or revealed in real time. The models evolve according to the following state and output equations:

$$\vec{x}_i(k+1) = A_i \vec{x}_i(k) + B_i \vec{u}_i(k) + B_{p,i} p(k) + B_{w,i} w_i(k) + f_i, \quad (1)$$

$$z_i(k) = C_i \vec{x}_u(k) + v_i(k) + g_i. \quad (2)$$

The initial condition for model i, denoted by $\vec{x}_i^0 = \vec{x}_i(0)$, is constrained to a polyhedral set with $c_0$ inequalities:

$$\vec{x}_i^0 \in X_0 = \{\vec{x} \in \mathbb{R}^n : P_0 \vec{x} \le p_0\}, \forall i \in \mathbb{Z}_N^+. \quad (3)$$

The first $m_u$ components of $\vec{u}_i$ are controlled inputs (i.e., to be designed as separating inputs), denoted as $u \in \mathbb{R}^{m_u}$, which are the same for all $\vec{u}_i$, while the other $m_d = m - m_u$ components of $\vec{u}_i$, denoted as $d_i \in \mathbb{R}^{m_d}$, are uncontrolled inputs that are model-dependent. Further, the states $\vec{x}_i$ are divided into $x_i \in \mathbb{R}^{n_x}$ and $y_i \in \mathbb{R}^{n_y}$, where $n_y = n - n_x$:

$$\vec{u}_i(k) = \begin{bmatrix} u(k) \\ d_i(k) \end{bmatrix}, \vec{x}_i(k) = \begin{bmatrix} x_i(k) \\ y_i(k) \end{bmatrix}. \quad (4)$$

The states $x_i$ and $y_i$ represent the subset of the states $\vec{x}_i$ that are the 'responsibilities' of the controlled and uncontrolled inputs, which are to be interpreted as u and $d_i$ with the following polyhedral domains (for $k \in \mathbb{Z}_{T-1}^0$) with $c_u$ and $c_d$ inequalities, respectively:

$$u(k) \in \mathcal{U} = \{u \in \mathbb{R}^{m_u} : Q_u u \le q_u\}, \quad (5)$$

$$d_i(k) \in \mathcal{D}_i = \{d \in \mathbb{R}^{m_d} : Q_{d,i} d \le q_{d,i}\}, \quad (6)$$

that must independently ensure the satisfaction of following polyhedral state constraints (for $k \in \mathbb{Z}_T^+$) with cx and $c_y$ inequalities:

$$x_i(k) \in X_{x,i} = \{x \in \mathbb{R}^{n_x} : P_{x,i} x \le p_{x,i}\}, \quad (7)$$

$$y_i(k) \in X_{y,i} = \{y \in \mathbb{R}^{n_y} : P_{y,i} y \le p_{y,i}\}. \quad (8)$$

On the other hand, the process noise $w_i$ and measurement noise $v_i$ are also polyhedrally constrained with $c_w$ and $c_v$ inequalities, respectively:

$$w_i(k) \in \mathcal{W}_i = \{w \in \mathbb{R}^{m_w} : Q_{w,i} w \le q_{w,i}\}, \quad (9)$$

$$v_i(k) \in \mathcal{V}_i = \{v \in \mathbb{R}^{m_v} : Q_{v,i} v \le q_{v,i}\}. \quad (10)$$

and have no responsibility to satisfy any state constraints.

Using the partitioned states and inputs, the corresponding state and output equations in (1) and (2) are rewritten as:

$$\vec{x}_i(k+1) = \begin{bmatrix} A_{xx,i} & A_{xy,i} \\ A_{yx,i} & A_{yy,i} \end{bmatrix} \vec{x}_i(k) + \begin{bmatrix} B_{xu,i} & B_{xd,i} \\ B_{yu,i} & B_{yd,i} \end{bmatrix} \vec{u}_i(k) + \begin{bmatrix} B_{xp,i} \\ B_{yp,i} \end{bmatrix} p(k) + \begin{bmatrix} B_{xw,i} \\ B_{yw,i} \end{bmatrix} w_i(k) + \begin{bmatrix} f_{x,i} \\ f_{y,i} \end{bmatrix}, \quad (11)$$

$$z_i(k) = C_i \vec{x}_i(k) + v_i(k) + g_i. \quad (12)$$

Moreover, for the model-independent parameter p(k) of each model $\mathcal{G}_i$, we assume that it has the following polyhedral operating region:

$$p(k) \in \mathcal{P} = \{p \in \mathbb{R}^{m_p} : Q_p p \le q_p\}, \quad (13)$$

over the entire horizon T, i.e., $p(k) \in \mathcal{P}$, $\forall k \in \mathbb{Z}_{T-1}^0$. At current time step t, let $p_m(t)$ denote the revealed parameter, which implies that in real time, only $p_m(k)$, $\forall(k) \in \mathbb{Z}_t^0$ are available s a "feedback" term for active input design.

Note that the above modeling framework is an extension of Ref. (9), Ref. (13) with the inclusion of the revealed parameters $p_m(k)$, $\forall k \in \mathbb{Z}_t^0$ at current time t, as well as unrevealed parameters p(k), k>t. The inclusion of the revealed parameters allows us to capture real-time information such as weight, road gradient, friction coefficients or reference outputs. The following example illustrates how reference outputs can be captured by (revealed/unrevealed) parameters:

Example 1. Consider a Simplified Model Given by $$x_i(k+1) = A_i^o x_i(k) + B_i u_i^o(k) + B_{w,i} w_i(k) + f_i,$$

with feedback control input $u_i^o(k)$ given by $$u_i^o(k) = -K_i(y_i^o(k) - y^{des}(k)) + u(k), \quad (14)$$

where $K_i$ is a constant control gain matrix, $y_i^o(k) = C_i^o x_i(k)$ is the output and $y^{des}(k)$ denotes the model-independent desired time-varying output reference. Then, we can represent this model in the form of (1) as:

$$x_i(k+1) = A_i x_i(k) + B_i u(k) + B_{p,i} p(k) + B_{w,i} w_i(k) + f_i,$$

with $A_i = A_i^o - B_i K_i C_i^o$, $B_p = -B_i K_i$ and the model-independent parameter $p(k) = y^{des}(k)$.

Remark 1.

We assume throughout the disclosure that the given affine models are always well-posed Ref. (9), Ref. (13). Otherwise, models are impractical.

In this disclosure, we aim to design a causal separating input vector $u_T(p_{m,T-1})$ as a function of the revealed parameters $P_{m,T-1}$, whose k-th subvector is $u_k(p_{m,k}, \{u_{j-1}(\cdot)\}_{j=0}^t)$ with $p_{m,i} = \text{vec}_{k=0}^i\{p_m(k)\}$, $i \in \{0, \ldots, T-1\}$ and $u_{-1}(\cdot) = \emptyset$. Specifically, $u_t(p_{m,k}, \{u_{j-1}(\cdot)\}_{j=0}^t)$ at each time instant $0 \le t \le T-1$ is computed by using only past and current revealed model-independent parameters $p_{m,t}$ as well as all past inputs $\{u_{j-1}(\cdot)\}_{j=0}^t$ (due to causality), so that the trajectories for all models are unique, while ensuring that the designed input is optimal with respect to a cost function $J(u_T^t)$. Since the separating input is updated with the newly available model-independent parameter $p_m$, the resulting performance will be improved when compared to an open-loop approach (see Ref. (9), Ref. (13) for example) that does not leverage this additional real-time information.

However, re-solving the open-loop optimization problem in real-time (i.e., at each time step) using the newly revealed parameters can be computationally prohibitive for many applications. Hence, we seek to alleviate the online computational burden by formulating it as a parametric active model discrimination problem that can be solved offline as a function of the revealed $p_m$ as parametric variables. Moreover, to respect causality, we formulate the parametric active model discrimination problem as a sequence of optimization problems, where the input variable of the optimization problem at time instant t is constrained to inherit the optimal input subsequence $u_T^{*,t-1}(k)$ for all $k \in \mathbb{Z}_{t-1}^0$ from the previous time instant t-1 (see discussion in Partition section below), as follows:

Problem 1 (Parametric Active Model Discrimination). Consider N well-posed affine models $\mathcal{G}_i$, and state, input and noise constraints defined in (3) and (5)-(10). For each time instant $t \in \mathbb{Z}_{T-1}^0$ (sequentially, starting from t=0), with all past and current revealed $p_m(k) \in \mathcal{P}$, $\forall k \in \mathbb{Z}_t^0$ as parametric variables, and given the optimal input sequence $u_T^{*,t-1}$ from the previous time instant t−1, find an optimal input sequence $u_T^{*,t}$ with fixed horizon T to minimize a given cost function $J(u_T^t)$ subject to $u(k) = u_T^{*,t-1}(k)$ for all $k \in \mathbb{Z}_{t-1}^0$ such that for all possible initial states $x_0$, uncontrolled inputs $d_T$, unrevealed parameters $P_{t+1:T-1}$, process noise $w_T$ and measurement noise $v_T$, only one model is valid, i.e., the output trajectories of any pair of models have to differ in at least one time instant of the horizon T.

Formally, for each time instant t with the newly revealed parameter $p_m(t)$ and all past parameters and chosen inputs, the optimization problem can be formulated as a sequence of optimization problems as follows $$\text{(for } t = 0, \ldots, T-1\text{):} \quad u_T^{*,t} = \arg\min_{w_T, x_T} J(u_T) \tag{15a}$$

$$\text{s.t. } \forall k \in \mathbb{Z}_{T-1}^0: \text{(5) holds,}$$

$$\left.\begin{array}{l} \forall i, j \in \mathbb{Z}_N^+, i < j, \forall k \in \mathbb{Z}_T^0, \\ \forall x_0, y_T, d_T, p_{t+1:T-1}, w_T, v_T: \\ (1)\text{-}(3), (6), (8)\text{-}(10), (13) \text{ holds;} \\ \forall k \in \mathbb{Z}_t^0: p(k) = p_m(k); \\ \forall k \in \mathbb{Z}_{t-1}^0: u_T^{*,t-1}(k) \end{array}\right\} : \begin{array}{l} \{\forall k \in \mathbb{Z}_T^+: \text{(7) holds}\} \land \\ \{\exists k \in \mathbb{Z}_T^0: z_i(k) \neq z_j(k)\}. \end{array} \tag{15b}$$

Note that the constraint (15b) not only enforces that the 'responsibility' of the controlled input is satisfied but also guarantees that all models are separated with the computed optimal input sequence $u_T^{*,t}$.

Main Approach

In this section, we propose a partition-based approach to solve the parametric active model discrimination problem defined in Problem 1. Although Problem 1 could be formulated and solved as a multi-parametric program, it remains computationally expensive when using currently available toolboxes, e.g., multi-parametric toolbox (MPT) Ref. (16), especially when there are many binary variables. Thus, in this disclosure, we consider a slightly more conservative approach that partitions the operating region $\mathcal{P}$ at each time instant, and solve a sequence of tractable optimization problems for each possible so that we can solve Problem 1 efficiently.

A. Partition

Recall the operating region $\mathcal{P}$ (cf. (13) for its definition) of the parameter p. At each time instant $t \in \mathbb{Z}_{T-1}^0$, let $\{\mathcal{P}_{\tilde{p}m(t)}(t)\}_{\tilde{p}m(t) \in S(t)}$ be a partition of $\mathcal{P}$ (cf. Definition 2) with $S(t) = \{1, \ldots, |S(t)|\}$, where $|S(t)|$ may vary with time t. Each subregion $\mathcal{P}_{\tilde{p}m(t)}(t)$ is a polyhedral set:

$$\mathcal{P}_{\tilde{p}m(t)}(t) = \{p \in \mathbb{R}^{m_p} : Q_{\tilde{p}m(t)}(t) p \leq q_{\tilde{p}m(t)}(t)\}. \tag{16}$$

As a result, any newly revealed parameter $p_m(t) \in \mathcal{P}_{\tilde{p}m(t)}(t)$ at time instant $t \in \mathbb{Z}_{T-1}^0$ can be over-approximated by $\tilde{p}_m(t) = p(t)$ with $p(t) \in \mathcal{P}_{\tilde{p}m(t)}(t)$.

To clearly illustrate the partition-based method, an example partition tree for the parameter p(t) over a fixed horizon T=3 is shown in FIG. 1. Since there is no revealed parameter before the initial time instant, i.e., t=−1, no partition is carried out at the very top of the partition tree. At time instant t=0, the operating region $\mathcal{P}$ is partitioned into two subregions $\mathcal{P}_1(0)$ and $\mathcal{P}_2(0)$ with S(0)={1,2} and we pre-compute the separating inputs offline for the two subregions instead of performing online computation using the revealed parameter $p_m(0)$ itself. At the next time instant t=1, we partition the operating region $\mathcal{P}$ again into two subregions $\mathcal{P}_1(1)$ and $\mathcal{P}_2(1)$ with S(1)={1,2}, which need not be identical to $\mathcal{P}_1(0)$ and $\mathcal{P}_2(0)$ at t=0, respectively. FIG. 1 shows a partition tree for the model-independent parameter p over a fixed horizon T=3.

Proceeding with t=1, we further partition the operating region into two for each of the preceding node and compute 4 optimal separating inputs corresponding to 4 different cases. Finally, at the last time instant t=T−1=2, we again partition the operating regions into two subregions and compute all 8 optimal separating inputs, which correspond to 8 different cases/trajectories of subregions that the yet unknown revealed parameters $p_m(0)$, $p_m(1)$ and $p_m(2)$ may lie in. As a result, we simplify the online process of solving Problem 1 for each time instant $t \in \mathbb{Z}_{T-1}^0$ to a simple look-up operation according to the newly revealed parameter $p_m(t)$ and all past parameters. Moreover, to ensure causality, we constrain the inputs for each node (i.e., at time instant t) to inherit the inputs of all previous time instants (i.e., from 0 to t−1) from their parents. For instance, at the node corresponding the trajectory of $\{\mathcal{P}_2(0), \mathcal{P}_1(1), \mathcal{P}_1(2)\}$, the input $u_T^2$ is constrained such that $u_T^2(0)$ and $u_T^2(1)$ must be the same as the optimal input $u_T^1(0)$ and $u_T^1(1)$ from its parent with the trajectory $\{\mathcal{P}_2(0), \mathcal{P}_1(1)\}$.

The problem of the partition-based parametric active model discrimination can be formulated as follows:

Problem 2 (Partition-Based Parametric Active Model Discrimination). For each trajectory of the partition tree given by $\{\mathcal{P}_{\tilde{p}m(k)}(k)\}_{k=0}^{T-1}$, the parametric active model discrimination problem in Problem 1 can be reformulated as a sequence of optimization problems as follows (for t= 0, . . . , T−1):

$$u_T^{*,t} = \arg\min_{w_T, x_T} J(u_T) \tag{17a}$$

$$\text{s.t. } \forall k \in \mathbb{Z}_{T-1}^0: \text{(5) holds,}$$

$$\left.\begin{array}{l} \forall i, j \in \mathbb{Z}_N^+, i < j, \forall k \in \mathbb{Z}_T^0, \\ \forall x_0, y_T, d_T, p_{t+1:T-1}, w_T, v_T: \\ (1)\text{-}(3), (6), (8)\text{-}(10), (13) \text{ holds;} \\ \forall k \in \mathbb{Z}_t^0: p(k) = p_m(k); \\ \forall k \in \mathbb{Z}_{t-1}^0: u_T^{*,t-1}(k) \end{array}\right\} : \begin{array}{l} \{\forall k \in \mathbb{Z}_T^+: \text{(7) holds}\} \land \\ \{\exists k \in \mathbb{Z}_T^0: z_i(k) \neq z_j(k)\}. \end{array} \tag{17b}$$

where $u_T^{*,t-1}$ is the optimal input sequence from the previous time instant t−1. Note that any pair of trajectories that share the same node at time instant t on the partition tree, their optimal input subsequences up to t must be the same.

Comparing with Problem 1, the equality constraints on parameter p(k) for all $k \in \mathbb{Z}_t^0$ are replaced by its over-approximation in Problem 2, which corresponds to the subregion that the revealed parameter $p_m(k)$ lies in.

B. Time-Concatenated Model

Before proceeding with the main approach for solving the partition-based parametric active model discrimination problem, we introduce some time-concatenated notations and write the considered N models in a time-concatenated form. The time-concatenated states and outputs are defined as $$\vec{x}_{i,T} = vec_{k=0}^{T}\{\vec{x}_i(k)\}, x_{i,T} = vec_{k=0}^{T}\{x_i(k)\},$$ (5)

$$y_{i,T} = vec_{k=0}^{T}\{y_i(k)\}, z_{i,T} = vec_{k=0}^{T}\{z_i(k)\},$$

while the time-concatenated inputs and noises are defined as $$\vec{u}_{i,T} = vec_{k=0}^{T-1}\{\vec{u}_i(k)\}, u_T = vec_{k=0}^{T-1}\{u(k)\}, d_{i,T} = vec_{k=0}^{T-1}\{d_i(k)\},$$ (10)

$$w_{i,T} = vec_{k=0}^{T-1}\{w_i(k)\}, v_{i,T} = vec_{k=0}^{T}\{v_i(k)\}.$$

In addition, for $0 \leq j_1 \leq j_2 \leq T-1$, we also define the model-independent parameter sequence as. $p_{j_1:j_2} = [p(j_1)^T, \ldots, p(j_2)^T]^T \in \mathbb{R}^{(j_2-j_1+1)m_p}$. Therefore, at each time instant $t \in \mathbb{Z}_{T-1}^0$ with the past and current revealed parameters $\{p_m(k)\}_{k=0}^t$ lying in subregions $\{\mathcal{P}_{\hat{p}m(k)}\}_{k=0}^t$, we have revealed parameters $p_{0:t} = vec_{k=0}^t\{p(k)\}$, where $p(k) \in \mathcal{P}_{\hat{p}m(k)}(k), \forall k \in \mathbb{Z}_t^0$, and unrevealed parameters $p_{t+1:T-1} = vec_{k=t+1}^{T-1}\{p(k)\}$, where $p(k) \in \mathcal{P}, \forall k \in \mathbb{Z}_{T-1}^{t+1}$. The time-concatenated parameter vector over the entire horizon is further defined as $p_T = [p_0^T : t \, p_{t+1:T-1}^T]^T$.

Given N discrete-time affine models, there are $$l = \binom{N}{2}$$

model pairs and let the mode $\iota \in \{1, \ldots, l\}$ denote the pair of models (i,j). Then, concatenating $\vec{x}_i^0, \vec{x}_{i,T}, x_{i,T}, y_{i,T}, d_{i,T}, z_{i,T}, w_{i,T},$ and $v_{i,T}$ for each model pair, we define $$\vec{x}_0^\iota = vec_{i,j}\{\vec{x}_i^0\}, \vec{x}_T^\iota = vec_{i,j}\{\vec{x}_{i,T}\}, \vec{u}_T^\iota = [u_T^T, d_T^{\iota T}]^T,$$

$$x_T^\iota = vec_{i,j}\{x_{i,T}\}, y_T^\iota = vec_{i,j}\{y_{i,T}\}, z_T^\iota = vec_{i,j}\{z_{i,T}\},$$

$$d_T^\iota = vec_{i,j}\{d_{i,T}\}, w_T^\iota = vec_{i,j}\{w_{i,T}\}, v_T^\iota = vec_{i,j}\{v_{i,T}\}.$$

The states and outputs over the entire time horizon for each mode $\iota$ can be written as simple functions of the initial state $\vec{x}_0^\iota$, inputs $u_T, d_T^\iota$, parameter $p_T$ and noises $w_T^\iota, v_T^\iota$:

$$x_T^\iota = M_x^\iota \vec{x}_0^\iota + \Gamma_{xu}^\iota u_T + \Gamma_{xd}^\iota d_T^\iota + \Gamma_{xp}^\iota p_T + \Gamma_{xw}^\iota w_T^\iota + \tilde{f}_x^\iota,$$ (18)

$$y_T^\iota = M_y^\iota \vec{x}_0^\iota + \Gamma_{yu}^\iota u_T + \Gamma_{yd}^\iota d_T^\iota + \Gamma_{yp}^\iota p_T + \Gamma_{yw}^\iota w_T^\iota + \tilde{f}_y^\iota,$$ (18)

$$\vec{x}_T^\iota = \overline{A}^\iota \vec{x}_0^\iota + \Gamma_u^\iota u_T + \Gamma_d^\iota d_T^\iota + \Gamma_p^\iota p_T + \Gamma_w^\iota w_T^\iota + \tilde{f}^\iota,$$ (20)

$$z_T^\iota = \overline{C}^\iota \vec{x}_T^\iota + \overline{D}_d^\iota d_T^\iota + \overline{D}_v^\iota v_T^\iota + \tilde{g}^\iota.$$ (21)

The matrices and vectors $M_*^\iota, \Gamma_{*u}^\iota, \Gamma_{*d}^\iota, \Gamma_{*p}^\iota, \Gamma_{*w}^\iota$ and $\tilde{f}_*^\iota$ for $* \in \{x,y\}$ and $\overline{A}^\iota, \Gamma_u^\iota, \Gamma_d^\iota, \Gamma_p^\iota, \Gamma_w^\iota, \overline{C}^\iota, \overline{D}_d^\iota, \overline{D}_v^\iota, \tilde{f}_\iota, \tilde{g}^\iota$ are defined below in the Time-Concatenated Matrices and Vectors Section. Moreover, the uncertain variables for each mode i are concatenated as $\overline{x}^\iota = [\vec{x}_0^{\iota T} \, d_T^{\iota T} \, p_T^T \, w_T^{\iota T} \, v_T^{\iota T}]^T$.

Time-Concatenated Matrices and Vectors $$\overline{A}_{i,T} = \begin{bmatrix} A_i \\ A_i^2 \\ \vdots \\ A_i^T \end{bmatrix}, \theta_{i,T} = \begin{bmatrix} \mathbb{1} & 0 & \ldots & 0 \\ A_i & \mathbb{1} & \ldots & 0 \\ \vdots & & \ddots & \\ A_i^{T-1} & A_i^{T-2} & \ldots & \mathbb{1} \end{bmatrix},$$

$$\overline{f}_{i,T} = vec_T\{f_i\}, \tilde{f}_{i,T} = \theta_{i,T}\overline{f}_{i,T}, \tilde{g}_{i,T} = vec_T\{g_i\},$$

$$E_i = \operatorname*{diag}_T\{C_i\}, F_{u,i} = \operatorname*{diag}_T\{D_{u,i}\}, F_{d,i} = \operatorname*{diag}_T\{g_i\},$$

-continued $$F_{v,i} = \operatorname*{diag}_T\{D_{v,i}\}, A_{x,i} = \begin{bmatrix} A_{xx,i} \\ A_{yx,i} \end{bmatrix}, A_{y,i} = \begin{bmatrix} A_{xy,i} \\ A_{yy,i} \end{bmatrix},$$

$$\dagger = \{x, y\} \quad * = \{u, d, p, w\}:$$

$$B_{*,i} = \begin{bmatrix} B_{x*,i} \\ B_{y*,i} \end{bmatrix}, B_{\dagger *,d,i,T} = \operatorname*{diag}_T\{B_{\dagger *,i}\},$$

$$\Gamma_{*,i,T} = \begin{bmatrix} B_{*,i} & 0 & \ldots & 0 \\ A_i B_{*,i} & B_{*,i} & \ldots & 0 \\ \vdots & & \ddots & \\ A_i^{T-1} B_{*,i} & A_i^{T-2} B_{*,i} & \ldots & B_{*,i} \end{bmatrix},$$

$$A_{\dagger,d,i,T} = \operatorname*{diag}_T\{[A_{\dagger x,i} \, A_{\dagger y,i}]\},$$

$$M_{\dagger,i,T} = A_{\dagger,d,i,T}\begin{bmatrix} \mathbb{1} \\ \overline{A}_{i,T-1} \end{bmatrix}, \overline{f}_{\dagger,i,T} = vec_T\{f_{\dagger,i}\},$$

$$\tilde{f}_{\dagger,i,T} = A_{\dagger,d,i,T}\begin{bmatrix} 0 \\ \theta_{i,T-1} \end{bmatrix}\overline{f}_{i,T-1} + \overline{f}_{\dagger,iT},$$

$$\Gamma_{\dagger *,i,T} = A_{\dagger,d,i,T}\begin{bmatrix} 0 & 0 \\ \Gamma_{*,i,T-1} & 0 \end{bmatrix} + B_{\dagger *,d,i,T}.$$

We then concatenate the polyhedral state constraints in (7) and (8), eliminating $x_T$ and $y_T$ in them and expressing them in terms of $\overline{x}^\iota$ and $u_T$. First, let $$\overline{P}_x^\iota = \operatorname*{diag}_{i,j}\operatorname*{diag}_T\{P_{x,i}\}, \overline{P}_y^\iota = \operatorname*{diag}_{i,j}\operatorname*{diag}_T\{P_{y,i}\},$$

$$\overline{p}_x^\iota = vec_{i,j}vec_T\{p_{x,i}\}, \overline{p}_y^\iota = vec_{i,j}vec_T\{p_{y,i}\}.$$

Then, we can rewrite the polyhedral constraints as:

$$\overline{P}_*^\iota x_T^\iota \leq \overline{p}_*^\iota \Leftrightarrow H_*^\iota(u_T), * \in \{x,y\}$$

where $H_*^\iota = \overline{P}_*^\iota[M_*^\iota \, \Gamma_{*d}^\iota \, \Gamma_{*p}^\iota \, \Gamma_{*w}^\iota \, 0] \, h_*^\iota(u_T) = \overline{p}_*^\iota - \overline{P}_*^\iota \Gamma_{*u}^\iota u_T - \overline{P}_*^\iota \tilde{f}_*^\iota$. Similarly, let $$\overline{Q}_u = \operatorname*{diag}_T\{Q_u\}, \overline{Q}_\dagger^\iota = \operatorname*{diag}^{i,j}\operatorname*{diag}_T\{Q_{\dagger,i}\},$$

$$\overline{q}_u = vec_T\{q_u\}, \overline{q}_\dagger^\iota = vec_{i,j}vec_T\{q_{\dagger,i}\}, \dagger \in \{d,w,v\}.$$

Then, the uncertainties and input constraints in (5)-(6) and (9)-(10) over the entire horizon are equivalent to $\overline{Q}_u u_T \leq \overline{q}_u$ and $\overline{Q}_\dagger^\iota \dagger_T^\iota \leq \overline{q}_\dagger^\iota$. In addition, since the revealed parameters $\{p_m(k)\}_{k=0}^t$ are located in subregions $\{P_{\hat{p}m(k)}(k)\}_{k=0}^t$, the parameters $p_{0:t}$ satisfy $$\overline{Q}_{p_m,0:t} p_{0:t} \leq \overline{q}_{p_m,0:t},$$

where $\overline{Q}_{p_m,0:t} = \operatorname*{diag}_{k=0}^t\{Q_{\hat{p}_{m(k)}}(k)\}$ and $\overline{q}_{p_m,0:t} = vec_{k=0}^t\{q_{\hat{p}_{m(k)}}(k)\}$.

Due to the fact that parameters $p_{t+1:T-1}$ are unrevealed at the time instant t, we also have $$\overline{Q}_{p,t+1:T-1} p_{t+1:T-1} \leq \overline{q}_{p,t+1:T-1},$$

where $\overline{Q}_{p,t+1:T-1} = \operatorname*{diag}_{T-t-1}\{Q_p\}$ and $\overline{q}_{p,t+1:T-1} = vec_{T-t-1}\{q_p\}$.
As a consequence, the polyhedral constraint on $p_T$ is obtained as $$\overline{Q}_{p,t} p_T \leq \overline{q}_{p,t},$$

with $$\overline{Q}_{p,t} = \begin{bmatrix} 0 & \overline{Q}_{p,t+1:T-1} \\ \overline{Q}_{p_m,0:t} & 0 \end{bmatrix} \text{ and}$$

$$\overline{q}_{p,t} = \begin{bmatrix} \overline{q}_{p_m,0:t} \\ \overline{q}_{p,t+1:T-1} \end{bmatrix}.$$

Moreover, we concatenate the initial state constraint in (3):

$$\overline{P}_0^t = \text{diag}_2\{P_0\}, \overline{p}_0^t = \text{vec}_2\{p_0\}.$$

Hence, in terms of $\overline{x}^t$, we have a polyhedral constraint of the form $H_{\overline{x},t}^t \overline{x}^t \leq h_{\overline{x},t}^t$ for each time $t \in \mathbb{Z}_{T-1}^0$, with $$H_{\overline{x},t}^t = \begin{bmatrix} \overline{P}_0^t & 0 & 0 & 0 & 0 \\ 0 & \overline{Q}_d^t & 0 & 0 & 0 \\ 0 & 0 & \overline{Q}_{p,t}^t & 0 & 0 \\ 0 & 0 & 0 & \overline{Q}_w^t & 0 \\ 0 & 0 & 0 & 0 & \overline{Q}_v^t \end{bmatrix}, h_{\overline{x},t}^t = \begin{bmatrix} \overline{p}_0^t \\ \overline{q}_d^t \\ \overline{q}_{p,t}^t \\ \overline{q}_w^t \\ \overline{q}_v^t \end{bmatrix}.$$

C. Active Model Discrimination Approach

Using the time-concatenated models, we proposed an optimization-based approach to solve Problem 2. Throughout this disclosure, we assume that the following holds:

Assumption 1.

In the concatenated constraint of the 'responsibility' of the uncontrolled input, i.e., is $H_y^t \overline{x}^t \leq \overline{p}_y^t - \overline{P}_y^t \overline{f}_y^t - \overline{P}_y^t T_{yu}^t u_T$, $\overline{P}_y^t T_{yu} = 0$ is satisfied.

Note that Assumption 1 ensures that the resulting optimization problem does not have bilinear terms. If Assumption 1 does not hold, the problem ($P_{PPDID}$) results in a mixed-integer nonlinear program (MINLP). A particular solution to this problem is provided in Ref. (13), where a sequence of restriction approach reduces this MINLP into a computationally tractable sequence of optimization problems.

Due to the semi-infinite non-convex constraint (17b), Problem 2 is still not computationally tractable. To tackle this, we reformulate the optimization problem for each trajectory of the partition tree in Problem 2 as a bilevel optimization problem in the following lemma, and then further cast it into a single level optimization problem by applying KKT conditions in Theorem 1.

Lemma 1 (Bilevel Optimization Formulation). For each time instant $t \in \mathbb{Z}_{T-1}^0$, given a separability index $\in$ and a trajectory on the partition tree corresponding to subregions $\{\mathcal{P}_{\tilde{p}_{m(k)}}(k)\}_{k=0}^{T-1}$, the partition-based parametric active model discrimination problem in Problem 2 is equivalent to a sequence of bilevel optimization problems (for $t=0, \ldots, T-1$) with the following outer problem:

$$u_T^{*,t} = \underset{u_T}{\text{argmin}} J(u_T) \quad (22a)$$

s.t. $\forall i \in \mathbb{Z}_N^+, \forall k \in \mathbb{Z}_{T-1}^0$: (5) holds, $$\left. \begin{array}{l} \forall i, j \in \mathbb{Z}_N^+, i < j, \forall k \in \mathbb{Z}_T^0, \\ \forall x_0, y_T, d_T, p_{t+1:T-1}, w_T, v_T \\ (1)-(3), (6), (8)-(10), (13) \text{ hold} \\ \forall k \in \mathbb{Z}_t^0, \forall p(k): p(k) \in \mathcal{P}_{\tilde{p}_{m(k)}}(k); \\ \forall k \in \mathbb{Z}_{t-1}^0: u(k) = u_T^{*,t-1}(k) \end{array} \right\} : \begin{array}{l} \forall k \in \mathbb{Z}_T^+: \\ (7) \text{ holds,} \end{array} \quad (22b)$$

$$\forall \iota \in \mathbb{Z}_I^+: \delta^{\iota*}(u_T) \geq \epsilon, \quad (22c)$$

where $u_T^{*,t-1}$ is the optimal input sequence from time instant $t-1$ and $\delta^{\iota*}(u_T)$ is the solution to the inner problem:

$$\delta^{\iota*}(u_T) = \min_{\delta^\iota, x_0^\iota, d_T^\iota, p_T, w_T^\iota, v_T^\iota} \delta^\iota \quad (23a)$$

s.t. $\forall i \in \mathbb{Z}_N^+, \forall k \in \mathbb{Z}_{T-1}^0$: (1) holds, $$\forall i \in \mathbb{Z}_N^+, \forall k \in \mathbb{Z}_T^+: \text{(2) holds}, \quad (23b)$$

$$\left. \begin{array}{l} \forall x_0^j, y_T^j d_T^j, \\ p_{t+1:T-1}, w_T^j, v_T^j \end{array} \right\} : \begin{array}{l} (3), (6), (13), \\ (8)-(10) \text{ hold}, \end{array} \quad (23c)$$

$$\forall k \in \mathbb{Z}_t^0, \forall p(k): p(k) \in \mathcal{P}_{\tilde{p}_{m(k)}}(k), \quad (23d)$$

$$\forall k \in \mathbb{Z}_{t-1}^0: u(k) = u_T^{*,t-1}(k), \quad (23e)$$

$$\forall l \in \mathbb{Z}_{n_z}^1, k \in \mathbb{Z}_T^0: |z_{i,l}(k)| \leq \delta^\iota. \quad (23f)$$

Proof. Since the universal quantifier distributes over conjunction Ref. (17), we can separate the constraint (17b) of Problem 2 into two independent constraints for all possible values of the uncertain variables at time instant $t \in \mathbb{Z}_{T-1}^0$, i.e., the 'responsibility' of the controlled input and the separation condition, respectively. Note that the constraint associated with the 'responsibility' of the controlled input is convex and kept in the outer problem. We only convert the non-convex separation condition by considering an equivalent formulation using double negation to get the inner problem. Details about implementing the double negation on the separation condition can be found in Ref. (9).

Then, leveraging the literature on robust optimization Ref. (18), Ref. (19), we can convert the semi-infinite constraint in (22b) into linear constraints. Further, we can recast the bilevel optimization formulation in the foregoing lemma by applying KKT conditions to obtain a MILP with SOS-1 constraints, which can readily be solved using off-the-shelf optimization software, e.g., Gurobi and CPLEX Ref. (14), Ref. (15).

Theorem 1 (Partition-Based Parametric Discriminating Input Design as a Sequence of MILP). For each time instant $t \in \mathbb{Z}_{T-1}^0$ given a separability index $\in$ and a trajectory on the partition tree corresponding $\{\mathcal{P}_{\tilde{p}_{m(k)}}(k)\}_{k=0}^{T-1}$ the partition-based parametric active model discrimination problem (Problem 2) under Assumption 1 is equivalent to a sequence of MILP problems (for $t=0, \ldots, T-1$):

$$u_T^{*,t} = \arg \min_{u_T, \Pi^t, \delta^t, x^t, u_1^t, u_2^t, u_3^t} J(u_T)$$

s.t. $\overline{Q}_u u_T \leq \overline{q}_u$, $\forall k \in \mathbb{Z}_{t-1}^0: u(k) = u_T^{*,t-1}(k)$, $$\Pi^{t^T} \begin{bmatrix} h_{\overline{x},t}^t \\ \overline{p}_y^t - \overline{P}_y^t \hat{f}_y^t \end{bmatrix} \leq \overline{p}_x^t - \overline{P}_x^t \hat{f}_x^t - \overline{P}_x^t \Gamma_{xu}^t u_T,$$

$\Pi^t \text{diag}\{H_{\overline{x},t}^t, H_y^t\} = H_x^t, \Pi^t \geq 0,$ $\forall \iota \in \mathbb{Z}_I^+: \delta^\iota(u_T) \geq \epsilon, 0 = 1 - \mu_3^{\iota T} \mathbb{1},$ $$0 = \sum_{i=1}^{\kappa} \mu_{1,i}^\iota H_{\overline{x},t}^t(i, m) + \sum_{j=1}^{\xi} \mu_{2,j}^\iota R^\iota(j, m) + \sum_{j=\xi}^{\xi+\rho} \mu_{3,j-\xi}^\iota R^\iota(j, m),$$

$\forall m = 1, \ldots, \eta,$ $\tilde{H}_{x,t,i}^\iota \overline{x}^\iota - h_{x,t,i}^\iota \leq 0, \mu_{1,i}^\iota \geq 0, \forall i = 1, \ldots \kappa,$ -continued $$\tilde{R}_j^\iota \bar{x}^\iota - r_j^\iota + S_j^\iota u_T \leq 0, \mu_{2,j}^\iota \geq 0, \forall\, j = 1, \ldots \xi,$$

$$\tilde{R}_j^\iota \bar{x}^\iota - \delta^\iota - r_j^\iota + S_j^\iota u_T \leq 0, \mu_{3,j-\xi}^\iota \geq 0, \forall\, j = \xi+1, \ldots \xi+\rho,$$

$$\forall\, \iota \in \mathbb{Z}_I^+, \forall\, i \in \mathbb{Z}_\kappa^+\colon \text{SOS-1: } \{\mu_{1,i}^\iota, \tilde{H}_{\bar{x},t,i}^\iota \bar{x}^\iota - h_{\bar{x},t,i}^\iota\},$$

$$\forall\, \iota \in \mathbb{Z}_I^+, \forall\, j \in \mathbb{Z}_\xi^+\colon \text{SOS-1: } \{\mu_{2,j}^\iota, \tilde{R}_j^\iota \bar{x}^\iota - r_j^\iota + \tilde{S}_j^\iota u_T\},$$

$$\forall\, \iota \in \mathbb{Z}_I^+, \forall\, j \in \mathbb{Z}_{\xi+\rho}^{\xi+1}\colon \text{SOS-1: } \{\mu_{3,j-\xi}^\iota, \tilde{R}_j^\iota \bar{x}^\iota - \delta^\iota - r_j^\iota + \tilde{S}_j^\iota u_T\},$$

where $\Pi^\iota$, $u_{1,i}^\iota$, $u_{2,j}^\iota$, $u_{3,j-\epsilon}^\iota$, are dual variables, $\tilde{H}_{\bar{x},t,i}^\iota$ is the i-th row of $H_{\bar{x},t}^\iota$, $\tilde{R}_j^\iota$, $\tilde{S}_j^\iota$, and $r_j^\iota$ are the j-th row of $R^\iota$, $S^\iota$ and $r^\iota$, $\eta = I\,(Tm_p + 2n + 2T\,(m_d + m_w + m_v))$ is the number of columns of $H_{\bar{x},t}^\iota = I(Tm_p + 2c_0 + 2T(c_d + c_w + c_v))$ is the number of rows of $H_{\bar{x},t}^\iota$, $\epsilon = 2ITc_y$ is the number of rows of 0 in (30a), $\rho = 2ITn_z$ is the number of rows of 1 in (30a) and $u_T^{*,t-1}$ is the optimal input sequence from time instant t−1.

Proof. Since Assumption 1 holds, it can be verified that the concatenated form of (22b) is equivalently written as the following two constraints:

$$\forall\, k \in \mathbb{Z}_{t-1}^0\colon u(k) = u_T^{*,t-1} = u_T^{*,t-1}(k), \quad (25)$$

$$\begin{bmatrix} \max\limits_{\bar{x}^\iota} H_x^\iota \bar{x}^\iota \\ \text{s.t. } H_{\bar{x},t}^\iota \bar{x}^\iota \leq h_{\bar{x},t}^\iota \\ H_y^\iota \bar{x}^\iota \leq \bar{p}_y^\iota - \bar{P}_y^\iota \tilde{f}_y^\iota \end{bmatrix} \leq \bar{p}_x^\iota - \bar{P}_{x\tilde{f}_x}^\iota - \bar{P}_x^\iota \Gamma_{xu}^\iota u_T, \quad (26)$$

Thus, we can convert the above semi-infinite constraint into a tractable formulation for each time instant $t \in \mathbb{Z}_{T-1}^0$ by using tools from robust optimization Ref. (18), Ref. (19) to obtain its robust counterpart, as shown in problem ($P_{PPDID}$).

Moreover, concatenating the separation condition of the inner problem ($P_{inner}$) with time in each model pair $\iota \in \mathbb{Z}_I^+$ at time instant $t \in \mathbb{Z}_{T-1}^0$, the constraint (23f) becomes $$\Lambda^\iota \bar{x}^\iota \leq \delta^\iota - \bar{E}^\iota \tilde{f}^\iota - (\bar{E}^\iota \Gamma_u^\iota + F_u^\iota) u_T, \quad (27)$$

where $\Lambda^\iota$, $\bar{E}^\iota$, $\tilde{f}^\iota$, $\Gamma_u^\iota$, and $F_u^\iota$ are matrices related to the separability condition that will be defined in the Matrices and Vectors in Theorem 1 section below. In addition, we can concatenate the inequalities associated with $\bar{x}^\iota$, according to whether they are explicitly dependent on $u_T$ or not:

$$R^\iota \bar{x}^\iota \leq \begin{bmatrix} 0 \\ 1 \end{bmatrix} \delta^\iota + r^\iota - S^\iota u_T, \quad [\text{Explicitly dependent on } u_T] \quad (28)$$

$$H_{\bar{x},t}^\iota \bar{x}^\iota \leq h_{\bar{x},t}^\iota, \quad [\text{Implicitly dependent on } u_T] \quad (29)$$

where we define $$R^\iota = \begin{bmatrix} H_y^\iota \\ \Lambda^\iota \end{bmatrix},\ r^\iota = \begin{bmatrix} \bar{p}_y^\iota - \bar{P}_y^\iota \tilde{f}_y^\iota \\ -\bar{E}^\iota \tilde{f}^\iota \end{bmatrix},\ S^\iota = \begin{bmatrix} \bar{P}^\iota \Gamma_{yu}^\iota \\ \bar{E}^\iota \Gamma_u^\iota + F_u^\iota \end{bmatrix}.$$

Matrices and Vectors in Theorem 1:

$$\bar{A}^\iota = \operatorname*{diag}_{i,j}\{\bar{A}_{i,T}\},\ \bar{C}^\iota = \operatorname*{diag}_{i,j}\{E_i\},\ \tilde{g}^\iota = \operatorname*{vec}_{i,j}\{\tilde{g}_{i,T}\},$$

$$\Gamma_u^\iota = \operatorname*{vec}_{i,j}\{\Gamma_{u,i,T}\},\ \Gamma_d^\iota = \operatorname*{diag}_{i,j}\{\Gamma_{d,i,T}\},\ \Gamma_w^\iota = \operatorname*{diag}_{i,j}\{\Gamma_{w,i,T}\},$$

$$\Gamma_p^\iota = \operatorname*{diag}_{i,j}\{\Gamma_{p,i,T}\},\ \tilde{f}^\iota = \operatorname*{vec}_{i,j}\{\tilde{f}_{i,j}\},\ \bar{D}_u^\iota = \operatorname*{vec}_{i,j}\{F_{u,i}\},$$

$$\bar{D}_d^\iota = \operatorname*{diag}_{i,j}\{F_{d,i}\},\ \bar{D}_v^\iota = \operatorname*{diag}_{i,j}\{F_{v,i}\},\ \bar{E}^\iota = \begin{bmatrix} E_i & -E_j \\ -E_i & E_j \end{bmatrix},$$

$$\Lambda^\iota = \bar{E}^\iota [\bar{A}^\iota \quad \Gamma_d^\iota \quad \Gamma_w^\iota \quad 0] + [0 \quad \bar{F}_d^\iota \quad 0 \quad \bar{F}_v^\iota].$$

For $\dagger = \{x, y\}$:

$$\Gamma_{\dagger u}^\iota = \operatorname*{diag}_{i,j}\{\Gamma_{\dagger u,i,T}\},\ \Gamma_{\dagger d}^\iota = \operatorname*{diag}_{i,j}\{\Gamma_{\dagger d,i,T}\},\ \Gamma_{\dagger p}^\iota = \operatorname*{vec}_{i,j}\{\tilde{f}_{\dagger,i,T}\}.$$

$$\Gamma_{\dagger w}^\iota = \operatorname*{diag}_{i,j}\{\Gamma_{\dagger w,i,T}\},\ M_\dagger^\iota = \operatorname*{diag}_{i,j}\{M_{\dagger,i,T}\},\ \tilde{f}_\dagger^\iota = \operatorname*{vec}_{i,j}(\tilde{f}_{\dagger,i,T}).$$

For $* = \{d, v\}$:

$$\bar{F}_*^\iota = \begin{bmatrix} F_{*,i} & -F_{*,j} \\ -F_{*,i} & F_{*,j} \end{bmatrix},\ \bar{F}_u^\iota = \begin{bmatrix} F_{u,i} - F_{u,j} \\ F_{u,j} - F_{u,i} \end{bmatrix},\ \bar{g}^\iota = \begin{bmatrix} \tilde{g}_i - \tilde{g}_j \\ -\tilde{g}_i + \tilde{g}_j \end{bmatrix}.$$

Thus, the inner problem ($P_{inner}$) for each $\iota \in I$ in Lemma 1 can be written in the concatenated form:

$$\delta^{\iota*}(u_T) = \min_{\delta^\iota, \bar{x}^\iota} \delta^\iota$$

$$\text{s.t. } R^\iota \bar{x}^\iota \leq \begin{bmatrix} 0 \\ 1 \end{bmatrix} \delta^\iota + r^\iota - S^\iota u_T, \quad (30a)$$

$$H_{\bar{x},t}^\iota \bar{x}^\iota \leq h_{\bar{x},t}^\iota, \quad (30b)$$

$$\forall\, k \in \mathbb{Z}_{t-1}^0\colon u(k) = u_T^{*,t-1}(k). \quad (30c)$$

Then, by applying KKT conditions to ($P_{inner}$) and rewriting the complementary slackness constraints in the KKT conditions as SOS-1 constraints, we obtain the constraints in Problem ($P_{PPDID}$). Thus, for each time instant $t \in \mathbb{Z}_{T-1}^0$, we have converted the bilevel problem defined in Problem 1 into the single level MILP problem ($P_{PPDID}$).

Note that in comparison to a similar formulation without parameters in Ref. (9), the 'responsibility' of the controlled input (7) is enforced in the outer problem, as is required by the problem we are addressing, and as a result, it trivially holds in the inner problem and needs not be explicitly included there. Moreover, it is worth reiterating that any pair of trajectories that share the same node at time instant t on the partition tree must have the same optimal input subsequence up to t.

Simulation Examples

In this section, we apply our proposed approach to a highway lane changing scenario, where the underlying goal is to detect the intention of other road participants so as to improve driving safety and performance.

A. Parametric Model for a Lane Changing Scenario

Similar to the example in Ref. (9), we assume that the other vehicle always drives in the center of its lane and hence has no motion in the lateral direction. We also assume that the lane width is 3.2 m. Under these assumptions, the discrete time equations of motion for the ego and other vehicles are:

$$x_e(k+1) = x_e(k) + v_{x,e}(k)\delta t,$$

$$v_{x,e}(k+1) = (1 - K\delta t)v_{x,e}(k) + u_{x,e}(k)\delta t + w_{x,e}(k)\delta t + K v_{x,e}^{des}(k)\delta t,$$

$$y_e(k+1) = y_e(k) + v_{y,e}(k)\delta t + w_{y,e}(k)\delta t,$$

$$x_o(k+1) = x_o(k) + v_{x,o}(k)\delta t,$$

$$v_{x,o}(k+1) = v_{x,o}(k) + d_i(k)\delta t + w_{x,o}(k)\delta t,$$

where, respectively, $x_e$ and $y_e$, and $v_{x,e}$ and $v_{y,e}$ are the ego car's longitudinal and lateral positions in m, and the ego car's longitudinal and lateral velocities in $$\frac{m}{s} \cdot x_o$$

and $v_{x,o}$ are the other car's longitudinal position in m and longitudinal velocity in $$\frac{m}{s},$$

while $u_{x,e}$ and $d_i$ are ego car and other car's acceleration inputs in $$\frac{m}{s^2},$$

K is a constant feedback control gain that forces the ego car to follow its desired longitudinal velocity reference $v_{x,e}^{des}(k)$ (model independent), $w_{x,e}$, $w_{x,e}$ and $w_{x,e}$ are process noise signals in $$\frac{m}{s^2}$$

and $\delta t$ is the sampling time in s. As discussed in Example 1, we consider the ego car's time-varying reference $v_{x,e}^{des}(k)$ as a parametric variable in our vehicle models. In our simulations, we assume that the controlled inputs for model discrimination are $$u_{x,e}(k) \in \mathcal{U}_x \equiv [-7.85, 3.97]\frac{m}{s^2} \text{ and}$$

$$v_{y,e}(k) \in \mathcal{U}_y \equiv [-0.35, 0]\frac{m}{s}$$

(where y is in the direction away from the other lane), as well as a control gain of K=1, a desired velocity range of $$v_{x,e}^{des} \in [29, 33]\frac{m}{s},$$

and a sampling time of $\delta t=0.3$ s. In addition, we assume that we have a noisy observation $z(k)=v_{x,o}(k)+v(k)$.

We consider three driver intention models $i \in \{I, C, M\}$:

Inattentive Driver (i=I), who fails to notice the ego vehicle and tries to maintain his driving speed, thus proceeding with an acceleration input which lies in a small range $d_I(k) \in \mathcal{D}_I \equiv 10\% \cdot \mathcal{U}$:

$$A_I = \begin{bmatrix} 1 & \delta t & 0 & 0 & 0 \\ 0 & 1-K\delta t & 0 & 0 & 0 \\ 0 & 0 & 1 & 0 & 0 \\ 0 & 0 & 0 & 1 & \delta t \\ 0 & 0 & 0 & 0 & 1 \end{bmatrix},$$

$$B_I = \begin{bmatrix} 0 & 0 & 0 \\ \delta t & 0 & 0 \\ 0 & \delta t & 0 \\ 0 & 0 & 0 \\ 0 & 0 & \delta t \end{bmatrix},$$

$$B_{v_{x,e,I}^{des}} = [0 \ K\delta t \ 0 \ 0 \ 0]^T, f_I = [0 \ 0 \ 0 \ 0 \ 0]^T,$$

$$B_{w,I} = B_I, C_I = [0 \ 0 \ 0 \ 0 \ 1], D_I = 0, D_{v,I} = 1.$$

Cautious Driver (i=C), who tends to yield the lane to the ego car with the input equal to $-K_{d,C}(v_{x,e}(k)-v_{x,o}(k))-L_{p,C}(\bar{y}-y_e(k))+L_{d,C}v_{y,e}(k)+d_C(k)$, where $K_{d,C}=0.9$, $L_{p,C}=2.5$ and $L_{d,C}=8.9$ are PD controller parameters, $\bar{y}=2$ and the input uncertainty is $d_C(k) \in \mathcal{D}_C \equiv 5\% \cdot \mathcal{U}$:

$$A_C = \begin{bmatrix} 1 & \delta t & 0 & 0 & 0 \\ 0 & (1-K\delta t) & 0 & 0 & 0 \\ 0 & 0 & 1 & 0 & 0 \\ 0 & 0 & 0 & 1 & \delta t \\ 0 & (K_{d,C}\delta t) & (L_{p,C}\delta t) & 0 & (1+K_{d,C}\delta t) \end{bmatrix}$$

$$B_C = \begin{bmatrix} 0 & 0 & 0 \\ 0\delta t & 0 & 0 \\ 0 & \delta t & 0 \\ 0 & 0 & 0 \\ 0 & L_{d,C}\delta t & \delta t \end{bmatrix}, f_c = \begin{bmatrix} 0 \\ 0 \\ 0 \\ 0 \\ -L_{p,C}\bar{y}\delta t \end{bmatrix},$$

$$B_{v_{x,e,C}^{des}} = B_{v_{x,e,I}^{des}}, B_{w,C} = B_{w,I}, C_C = C_I,$$

$$D_C = D_I, D_{v,C} = D_{v,I}.$$

Malicious Driver (i=M), who does not want to yield the lane and attempts to cause a collision with input equal to $K_{d,M}(v_{x,e}(k)-v_{x,o}(k))+L_{p,M}(\bar{y}-y_e(k))-L_{d,M}v_{y,e}(k)+d_M(k)$, if provoked, where $K_{d,M}=1.1$, $L_{p,M}=2.0$ and $L_{d,M}=8.7$ are PD controller parameters, $\bar{y}=2$ and the input uncertainty satisfies $d_M(k) \in \mathcal{D}_M \equiv 5\% \cdot \mathcal{U}$:

$$A_M = \begin{bmatrix} 1 & \delta t & 0 & 0 & 0 \\ 0 & 1-K\delta t & 0 & 0 & 0 \\ 0 & 0 & 1 & 0 & 0 \\ 0 & 0 & 0 & 1 & \delta t \\ 0 & K_{d,M}\delta t & -L_{p,M}\delta t & 0 & 1-K_{d,M}\delta t \end{bmatrix},$$

$$B_M = \begin{bmatrix} 0 & 0 & 0 \\ \delta t & 0 & 0 \\ 0 & \delta t & 0 \\ 0 & 0 & 0 \\ 0 & -L_{d,M}\delta t & \delta t \end{bmatrix},$$

$$B_{v_{x,e,M}^{des}} = B_{v_{x,e,I}^{des}}, B_{w,M} = B_{w,I}, C_M = C_I,$$

$$D_M = D_I, D_{v,M} = D_{v,I}.$$

Without loss of generality, we assume that the initial position of the ego car is 0, and the initial position of the other car is constrained by their initial relative distance. The initial velocities of the cars are also constrained to match typical speed limits of the highway. Further, we assume that at the beginning, both cars are close to the center of the lanes. In this case, the initial conditions are as follows:

$$v_{x,e}(0) \in [30, 32]\frac{m}{s}, \quad y_e(0) \in [1.1, 1.8]m, \quad (31)$$
$$v_{x,o}(0) \in [30, 32]\frac{m}{s}, \quad x_0(0) \in [7, 12]m.$$

Moreover, the velocity of the ego vehicle is constrained between $$[27, 35]\frac{m}{s}$$

at all times to obey the speed limit of a highway and the lateral position of the ego vehicle is constrained between [0.5, 2]m. Process and measurement noise signals are also limited to the range of [−0.01, 0.01] and the separability threshold is set to $$\epsilon = 0.1\frac{m}{s}.$$

B. Simulation Results and Discussions

The operating region of $v_{x,e}^{des}(k)$ over the entire time horizon T=3 is $\mathcal{P} = [29,33]$ and for convenience, we choose to partition the operating region into two subregions that are identical for each time instant, i.e., $\mathcal{P}_{1(k)}=[29,31]$ and $\mathcal{P}_2(k)=[31,33]$ for k=0, 1, 2. In total, we have $2^T$ different trajectories, as depicted in the partition tree over the entire horizon in FIG. 1.

For our simulations, we consider two optimization costs: (i) $\|u_T\|_1$ that enforces sparsity (leads to minimal number of non-zero inputs) and (ii) $\|u_T\|_\infty$ that ensures comfort (with small maximum input amplitudes). For each trajectory, an optimal separating input is computed offline that guarantees the velocities of the other vehicles under each intention are different by at least $\epsilon=0.1$.

As observed in FIG. 1, by using the partition-based method, the cost at each node of the partition tree is reduced monotonically from its parent node. In particular, this means that our proposed approach improves on the performance of the approach that does not take the revealed information into account, shown at the top of the partition tree. When a certain node does not improve on the cost from its parent (e.g., at t=1 or t=2), it means the additional revealed parameter does not change the optimal input that is needed for separation. This can also be observed in FIG. 2, which shows the optimal input sequence associated with each trajectory. FIG. 2 shows trajectories of the controlled inputs when the operating range of the revealed parameter $p_m(k)=v_{x,e}^{des}(k)$ is partitioned into two subregions at each time. In figure legend, trajectories $\mathcal{P}_1$-$\mathcal{P}_8$ indicate different combinations of the partitions over the entire horizon and are defined as follows:

$\mathcal{P}_1=\{\mathcal{P}_1(0), \mathcal{P}_1(1), \mathcal{P}_1(2)\}, \mathcal{P}_2=\{\mathcal{P}_1(0),$
$\quad \mathcal{P}_1(1), \mathcal{P}_2(2)\},$ $\mathcal{P}_3=\{\mathcal{P}_1(0), \mathcal{P}_2(1), \mathcal{P}_1(2)\}, \mathcal{P}_4=\{\mathcal{P}_{1(0)},$
$\quad \mathcal{P}_2(1), \mathcal{P}_2(2)\},$ $\mathcal{P}_5=\{\mathcal{P}_2(0), \mathcal{P}_1(1), \mathcal{P}_1(2)\}, \mathcal{P}_6=\{\mathcal{P}_2(0),$
$\quad \mathcal{P}_1(1), \mathcal{P}_2(2)\},$ $\mathcal{P}_7=\{\mathcal{P}_2(0), \mathcal{P}_2(1), \mathcal{P}_1(2)\}, \mathcal{P}_8=\{\mathcal{P}_2(0),$
$\quad \mathcal{P}_2(1), \mathcal{P}_2(2)\}.$ In addition, $\mathcal{P}$ corresponds to the entire operating region.

Figure 2A:
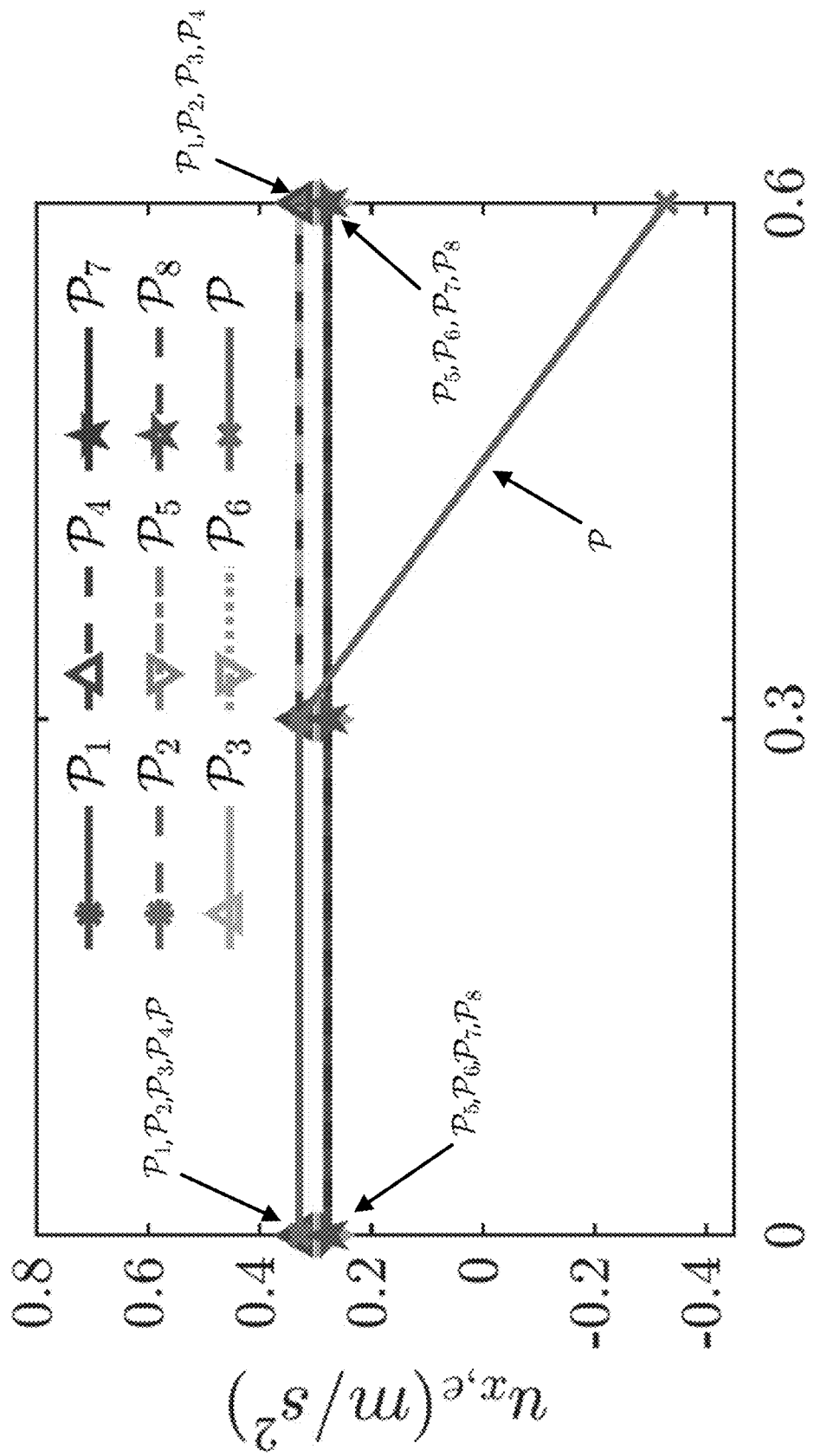
FIG. 2A shows a sequence of optimal ego vehicle longitudinal acceleration inputs for different partitions of the model-independent parameter p with minimized maximum input amplitudes.
Figure 2B:
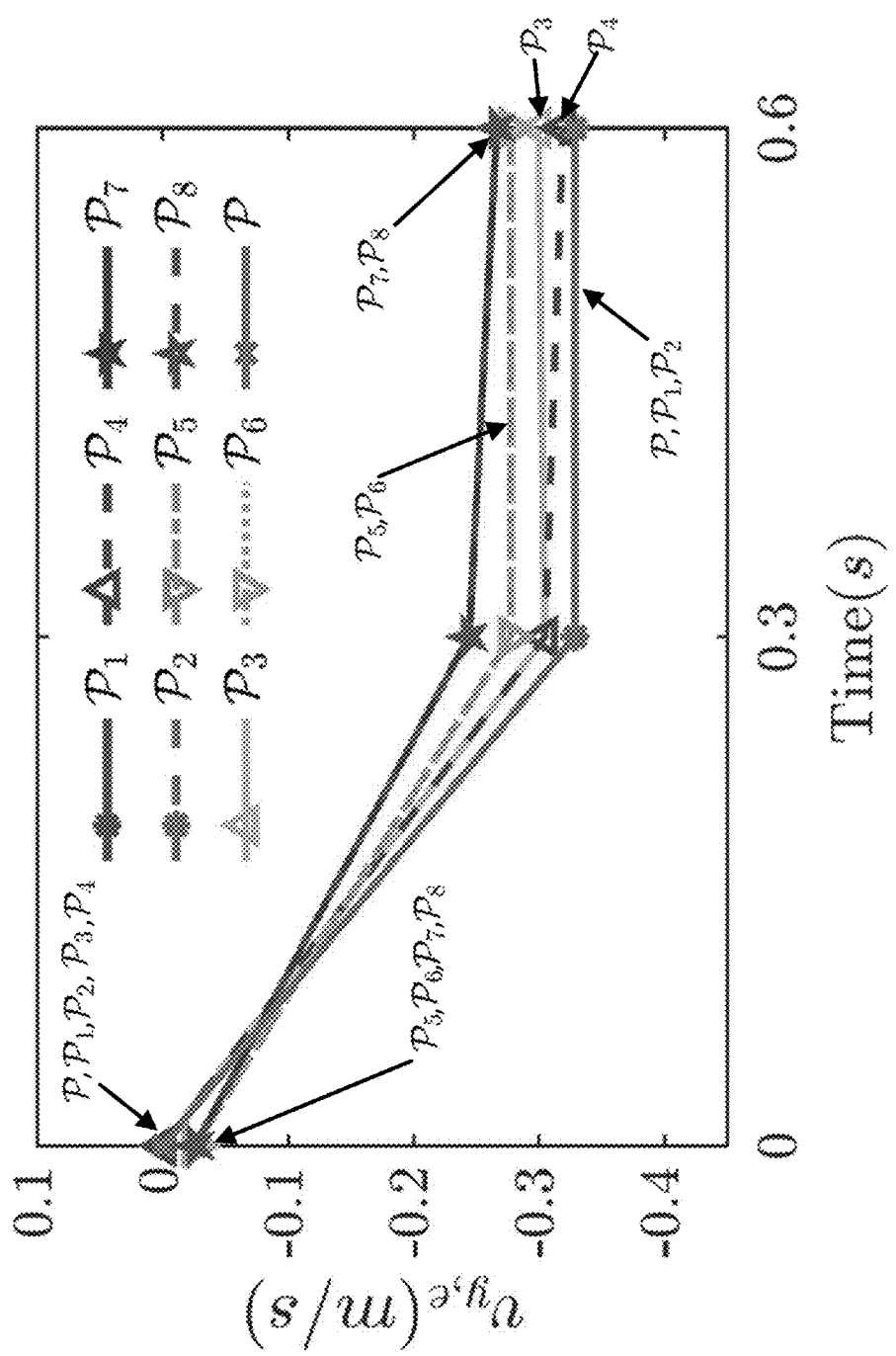
FIG. 2B shows a sequence of optimal ego vehicle lateral velocity inputs for different partitions of the model-independent parameter p with minimized maximum input amplitudes.
Figure 2C:
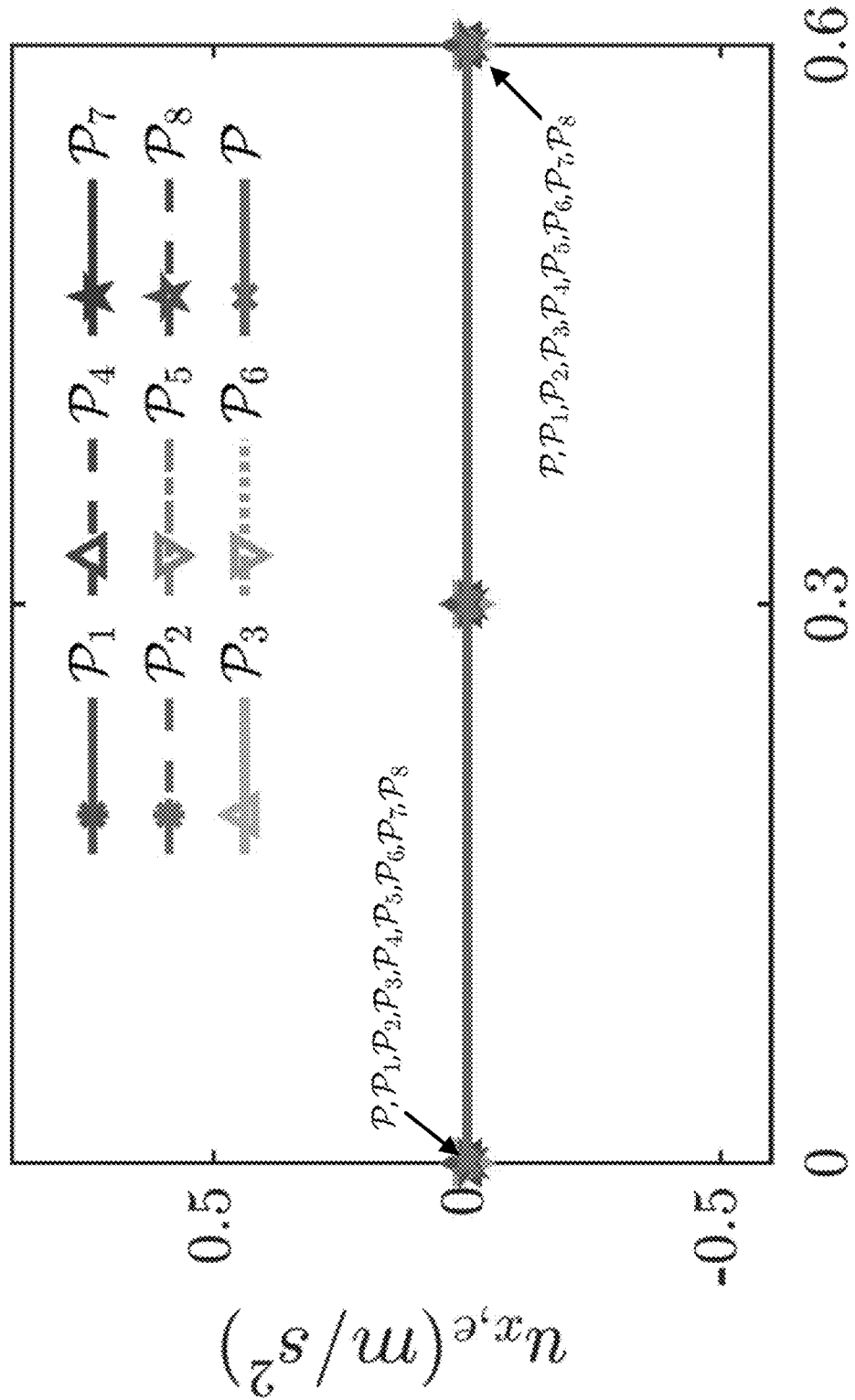
FIG. 2C shows a sequence of optimal ego vehicle longitudinal acceleration inputs for different partitions of the model-independent parameter p with minimized sum of input amplitudes.
Figure 2D:
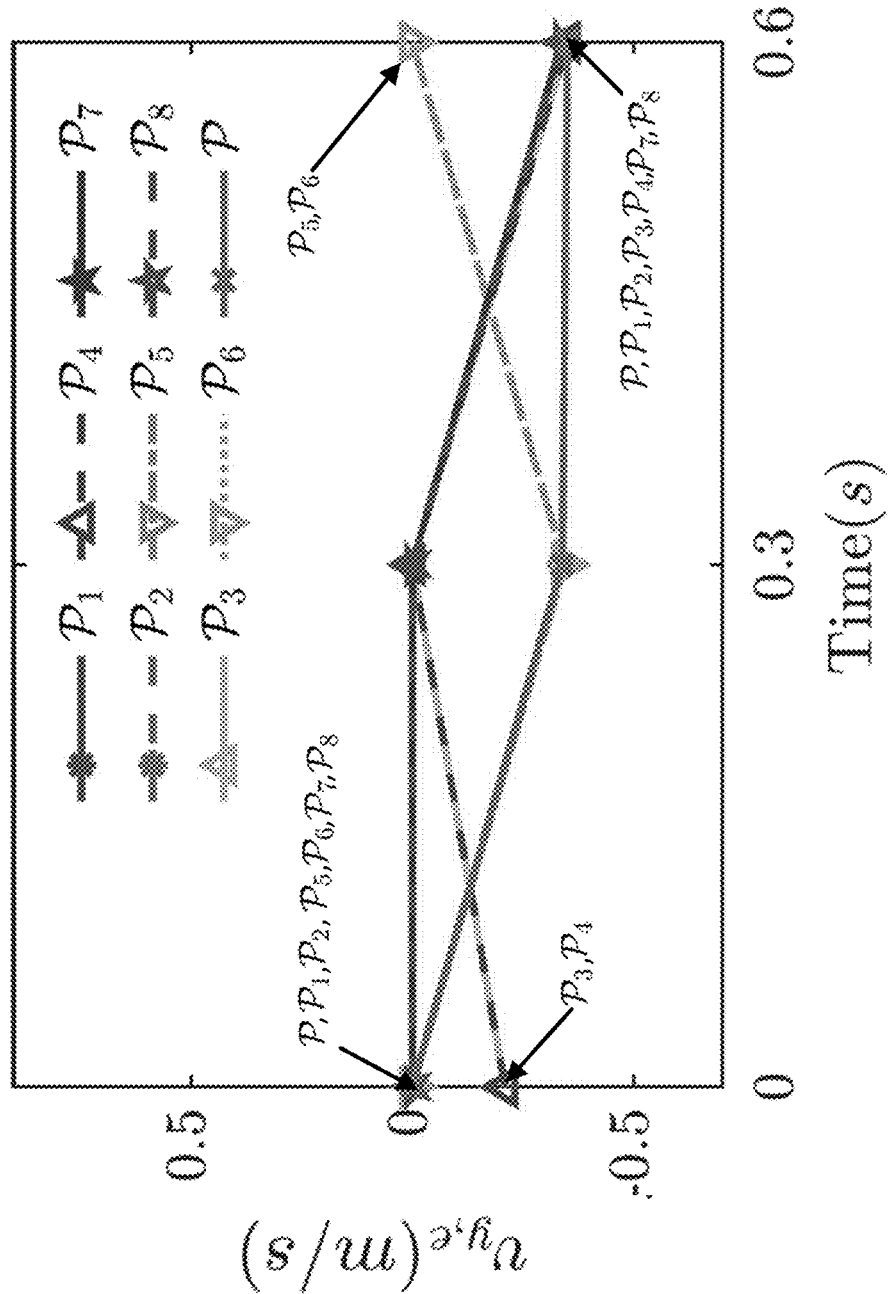
FIG. 2D shows a sequence of optimal ego vehicle lateral velocity inputs for different partitions of the model-independent parameter p with minimized sum of input amplitudes.

FIG. 2A shows ego vehicle longitudinal acceleration $u_{x,e}$ for $J=\|u_T\|_\infty$ for combinations of the partitions $\mathcal{P}_1$-$\mathcal{P}_8$. FIG. 2B shows ego vehicle lateral velocity $v_{y,e}$ for $J=\|u_T\|\infty$ for combinations of the partitions $\mathcal{P}_1$-$\mathcal{P}_8$. In FIGS. 2A and 2B, the longitudinal acceleration inputs and lateral velocity inputs are optimized to minimize the maximum input amplitude of the lateral velocity and/or longitudinal acceleration, as indicated by $J=\|u_T\|_\infty$. FIG. 2C shows ego vehicle longitudinal acceleration $u_{x,e}$ for $J=\|u_T\|_1$ for combinations of the partitions $\mathcal{P}_1$-$\mathcal{P}_8$. FIG. 2D shows ego vehicle lateral velocity $v_{y,e}$ for $J=\|u_T\|_1$ for combinations of the partitions $\mathcal{P}_1$-$\mathcal{P}_8$. In FIGS. 2C and 2D, the longitudinal acceleration inputs and lateral velocity inputs are optimized to minimize the sum of input, as indicated by $J=\|u_T\|_1$.

In this disclosure, a partition-based parametric active model discrimination approach was proposed for computing a sequence of optimal inputs that guarantee optimal separation/discrimination among a set of discrete-time affine time-invariant models with uncontrolled inputs, model-independent parameters and noise signals over a fixed time horizon, where the parameters are revealed in real-time. The approach allows us to take advantage of real time information (i.e., the revealed parameters) to improve the model discrimination performance. Moreover, we move the computation of the optimal separating input offline by considering the revealed parameters as parametric variables and introducing partitions of its operating region. Leveraging tools from robust optimization and applying double negation and KKT conditions, we formulate the offline input design problem as a sequence of tractable MILP problems. We demonstrated our proposed approach on an example of intention estimation in a lane changing scenario, showing that the proposed approach outperforms the approach that does not use the real-time revealed information about the parameters.

Example

This Example is provided in order to demonstrate and further illustrate certain embodiments and aspects of the present invention and is not to be construed as limiting the scope of the invention.

Figure 3:
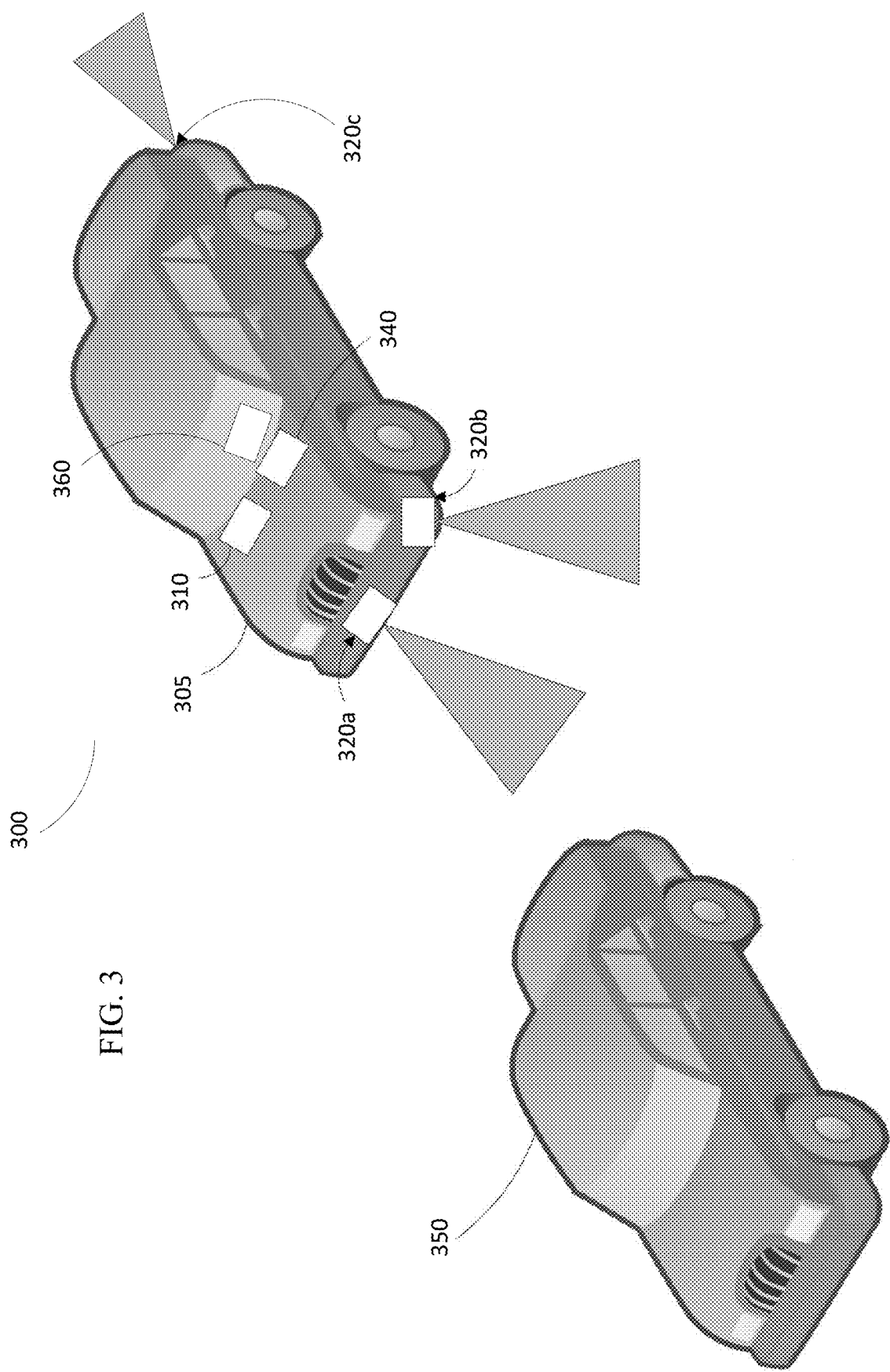
FIG. 3 shows an exemplary embodiment of a driving control system in an ego vehicle.
Figure 4:
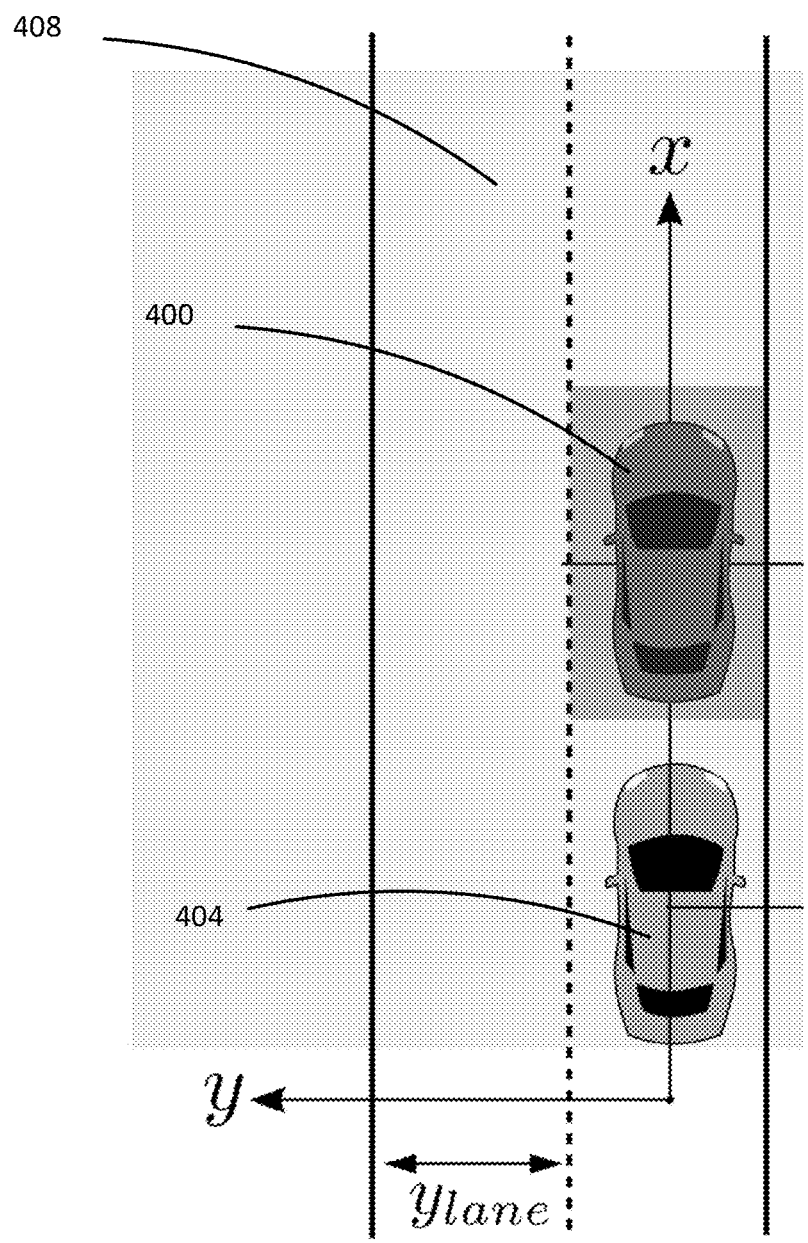
FIG. 4 shows an ego vehicle and a second vehicle on a roadway.

Referring now to FIG. 3 and FIG. 4, an exemplary embodiment of a driving control system 300 is shown. The system includes a plurality of sensors are coupled to the ego vehicle 305. The sensors can sense information associated with the ego vehicle 305, and/or a second vehicle 350. The second vehicle 350 may be traveling on a roadway in the same direction and lane as the ego vehicle 305. The plurality of sensors can include a first sensor 310 that can be a speedometer, a global positioning system (GPS) sensor, or other applicable sensor configured to sense a speed and/or velocity of the ego vehicle 305. The first sensor 310 can also be an accelerometer, a gyroscope, a weight sensor, a temperature sensor, a current sensor, a voltage sensor, or another suitable sensor(s) configured to sense a gradient of a roadway the ego vehicle 305 is traveling on, a weight of the ego vehicle 305, an environmental temperature, a temperature of a component of the ego vehicle 305, a current and/or a voltage of an electrical component of the ego vehicle 305, or another parameter of the ego vehicle 305 or environmental surroundings of the ego vehicle 305 that may not be known until the ego vehicle 305 is moving and/or has left a production facility. Alternatively or additionally, information about environmental surroundings of the ego vehicle 305 such as a gradient of a roadway can be determined using a GPS sensor and/or a database of roadway information including information about the roadway at the current location of the ego vehicle 305.

The first sensor can be coupled to a controller 340 having a memory and a processor and coupled to the ego vehicle 305. The controller 340 can have an intention estimation algorithm stored in the memory, which will be explained in detail in FIG. 4. The controller 340 can be coupled to a vehicle control system (not shown) of the ego vehicle 305. In some embodiments, the controller 340 can be coupled to the vehicle control system via a Controller Area Network (CAN) bus. The vehicle control system can be an autonomous or semi-autonomous vehicle control system with any number of controllers, interfaces, actuators, and/or sensors capable of controlling a motor, engine, transmission, braking system, steering system, or other subsystem of the ego vehicle. The vehicle control system can be used to perform a vehicle maneuver such as lane changing maneuver, overtaking a second vehicle 350, changing the speed the ego vehicle 305 by controlling the braking and/or throttle of the ego vehicle 305, controlling the steering of the front and/or rear wheels of the ego vehicle 305, or controlling the movement (i.e. speed, acceleration, direction of travel, etc.) of the ego vehicle 305 via one or more subsystems of the ego vehicle 305. The vehicle control system can control components such as the motor, engine, transmission, braking system, steering system, or other subsystem, based on information received from sensors coupled to driver inputs devices such as a brake pedal, accelerator pedal, steering wheel, gear shifter, etc. in order to execute the vehicle maneuver. For example, the vehicle control system can control the motor or engine based on information received from a sensor coupled to the accelerator pedal. As will be described later, an intention determination process can provide input values to control the above components of the vehicle control system in order to cause the vehicle control system to perform a vehicle maneuver. In some embodiments, the controller 340 may be a portion of the vehicle control system.

The plurality of sensors can include a second sensor 320 coupled to the controller 340 and configured to sense surroundings of the ego vehicle 305. The second sensor 320 can be a sensor such as a LiDAR sensor, a camera such as an infrared camera or visible light camera, an ultrasonic sensor, a radar sensor, or any other type of sensor capable of sensing the location, speed, and or velocity of objects around the ego vehicle 305. The second sensor 320 may sense information about a location, speed, or velocity of the second vehicle 350. The information, either directly or indirectly, may be used by the controller 340 to calculate a location of the second vehicle 350 relative to the ego vehicle 305, a headway distance between the second vehicle 350 and the ego vehicle 305, a lateral velocity or acceleration of the second vehicle 350, a longitudinal velocity or acceleration of the second vehicle 350, a lateral location of the ego vehicle 305, and/or a lateral location of the second vehicle 350. Lateral location can be the location of the vehicle within a width of a lane such as $y_{lane}$ of a roadway 408 or the location along the y direction shown in FIG. 4, while longitudinal location can be the location of the vehicle along the x direction shown in FIG. 4. The x direction can be the same general direction as traffic flow along the roadway 408. FIG. 4 shows a red car 400 to indicate the second vehicle, and a blue car 404 to indicate the ego vehicle.

The second sensor 320 can be capable of sensing a speed or velocity of an object natively. Alternatively, the speed or velocity of the object can be calculated by the controller 340 information sensed by the sensor using methods known in the art, such as determining a velocity of a vehicle from location information sensed by a LiDAR sensor.

The plurality of sensors can include at least one third sensor 360 that can be coupled to the controller 340 and configured to sense driver input data. The third sensor 360 can be coupled to an accelerator pedal, a brake pedal, a steering wheel, or any other driver control input. The third sensor 360 can be any applicable sensor type to measure a position of the driver input controls. For example, the third sensor 360 could be a potentiometer coupled to the accelerator pedal or brake pedal, or a rotary encoder coupled to the steering wheel. Any number of third sensors can be used to measure any number of driver inputs, for example the accelerator pedal can be coupled to an third sensor 360, the brake pedal can be coupled to another third sensor 360, and the steering wheel can be coupled to an additional third sensor 360.

Any number of first sensors 310, second sensors 320, and third sensors 360 can be coupled to the ego vehicle 305 in order to improve the speed, velocity, and/or object location sensing capabilities of the ego vehicle 305. For example, multiple second sensors 320a and 320b can be mounted to the front of the ego vehicle 305. At least one second sensor can be mounted to the rear of the ego vehicle 305, as indicated by second sensor 320c. Second sensor 320c can be used to sense the location of the second vehicle 350 when the ego vehicle 305 is ahead of the second vehicle 350, i.e. when the ego vehicle 305 is almost done overtaking the second vehicle 350. The second sensors 320 may include different sensor types, i.e., some of the second sensors 320 are cameras while others are LiDAR sensors. The plurality of sensors can be divided up as a number of sub-pluralities of sensors, i.e., a first plurality of sensors, a second plurality of sensors, and a third plurality of sensors. Some of the sub-pluralities of sensors may share sensors or have a common sensor, i.e., a sensor may belong to the first plurality of sensors and the second plurality of sensors. In some embodiments, both the first plurality of sensors and the second plurality of sensors can include a speedometer. It is contemplated that a single sensor capable of sensing all of the parameters described above could be used in place of the first sensor 310, second sensor 320, and third sensor 360. Additionally, multiple controllers 340 may be used in order to implement the driving control system 300.

Referring now to FIG. 3 as well as FIG. 5, an exemplary embodiment of a process 500 for implementing a vehicle monitoring system for causing an ego vehicle to perform a vehicle maneuver based on predetermined vehicle input values as well as detecting an intention of a second vehicle is shown. The vehicle monitoring system can be used to monitor the ego vehicle during certain driving scenarios such as a lane changing procedure or a lane merge scenario. Generally, the process 500 selects a partition of an operating region of a parametric variable based on received parametric variable information and causes a vehicle control system of the ego vehicle to perform a vehicle maneuver based on the predetermined ego vehicle input. The process 500 can also infer an intention of a second vehicle based on received second vehicle information about the second vehicle and causes the vehicle control system to perform a second vehicle maneuver based on the intention. The process 500 can be implemented as instructions on a memory of a computational device such as the controller 340.

At 504, the process 500 can receive parametric variable information from at least one of a first plurality of sensors coupled to an ego vehicle. The ego vehicle can be ego vehicle 305, and the first plurality of sensors can include any number of first sensors 310, second sensors 320, and third sensors 360 coupled to the ego vehicle 305. The parametric variable information can be used to determine a value of a parametric variable. The parametric variable can be a desired longitudinal velocity, a road gradient, a weight of the ego vehicle, a road gradient of a road in contact with the ego vehicle, a friction coefficient of tires coupled to the ego vehicle, a relative speed of wind as compared to the ego vehicle, a steering input value, a location of an object located near a roadway that the ego vehicle is traveling on, or another parametric variable that may not be known until the ego vehicle is being utilized, i.e. after the ego vehicle has left a manufacturing facility. For example, the parametric variable can be a desired longitudinal velocity, which can may vary based on the roadway and/or preferences of a driver of the ego vehicle. As another example, the location of an object such as another vehicle or an animal such as a deer on and/or nearby the roadway will not be known until the ego vehicle is moving. The parametric variable information can be used to determine the value of the parametric variable for a given discrete time point. For example, the value of the parametric variable can be directly determined if the parametric variable is a steering input value and the parametric variable information includes a position of the steering wheel of the ego vehicle received from a sensor configured to sense a position of the steering wheel. As another example, the value of the parametric variable can be determined if the parametric variable is a desired longitudinal velocity (i.e., a preferred cruise speed of an ego vehicle) and the parametric variable information includes a preferred cruise speed value of the ego vehicle received from a sensor coupled to the ego vehicle or an autonomous driving process of the ego vehicle. The driver can input a preferred cruise speed value to the ego vehicle, for example via one or more cruise control sensors (i.e. one or more sensors configured to receive information indicative of a preferred speed value for the ego vehicle to travel at) which can be provided to and received by the process 500. Alternatively, the process 500 can receive a preferred cruise speed value from an autonomous vehicle process being executed to control the ego vehicle. The autonomous vehicle process can determine a preferred cruise speed value based on a road gradient, current traffic information, a speed limit of the roadway the ego vehicle is traveling on, and/or other environmental factors, and provide the preferred cruise speed value to the process 500. The process 500 can also receive ego vehicle information about the ego vehicle from sensors coupled to the ego vehicle. The ego vehicle information can be used to directly or indirectly determine a longitudinal velocity of the ego vehicle, longitudinal acceleration of the ego vehicle, one or more wheel positions of the ego vehicle, a lane location (i.e. location within a lane) of the ego vehicle, lateral velocity of the ego vehicle, inputs from sensors coupled to an accelerator pedal, a brake pedal, a steering wheel, or any other driver control input, or any other operational parameters relevant to monitoring and/or controlling movement of the ego vehicle. The process 500 can then proceed to 508.

At 508, the process 500 can select a partition of an operating region of the parametric variable based on the parametric variable information. The parametric variable information can be used to directly and/or indirectly determine the value of the parametric variable for a given discrete time point as described above. Any calculations performed in order to determine the value of the parametric variable may be performed in 504 or 508. Once the value of the parametric variable is determined, the process 500 can determine a partition of the operating region of the parametric variable the value lies in. The operating region can include a range of values of the parametric variable. The partition can include a subset of the range of values of the operation region. For example, if the parametric variable is a desired longitudinal velocity, the value of the parametric variable for the given discrete point is 30 m/s, the operating region includes [29-33 m/s] and includes a first partition includes [29-31 m/s] and second partition includes [31-33 m/s], the process 500 can select the first partition. Each partition can be associated with a predetermined ego vehicle input that can be previously calculated to satisfy one or more constraints. The predetermined ego vehicle input can be calculated such that for all $k \in \mathbb{Z}_{t-1}^{6}$ such that for all possible initial states $x_0$, uncontrolled inputs $d_T$, and unrevealed parameters $p_{t+1:T-1}$ (which may include future values of the parametric variable), process noise $w_T$, and/or measurement noise $v_T$, only one intention model is valid as described above. The predetermined ego vehicle input can be included in a set of predetermined ego vehicle inputs associated with a trajectory of partitions as described above. The predetermined ego vehicle input can be used to determine input values for controlling movement of the ego vehicle. For example, the predetermined ego vehicle input can include a longitudinal acceleration value and a lateral velocity value. The trajectory of partitions can include a set of partitions corresponding to a set of discrete time points. For example, the trajectory of partitions can include a first partition corresponding to a first time point, a second partition corresponding to a second time point, and a third partition corresponding to a third time point. Some partitions include equivalent subsets of the operating region. For example, the first partition and the third partition may each include a first subset of the range of values of the operation region, and the second partition may include a second subset of the range of values of the operation region. The trajectory can be included in a set of trajectories determined from a partition tree, i.e. the partition tree shown in FIG. 1. For each trajectory, the set of predetermined ego vehicle inputs associated with the trajectory can be calculated to guarantee values of an intention model variable such as longitudinal velocity associated with a second vehicle such as the second vehicle 350 differ by a predetermined threshold under each intention model in a set of intention models by the end of the trajectory. The intention model variable may be referred to as a second vehicle operating parameter if the intention model variable is associated with a measurable variable of the second vehicle. In other words, the intention of the second vehicle can be guaranteed to have been determined after every predetermined ego vehicle input in the set has been provided to the vehicle control system and the vehicle control system has accordingly controlled the ego vehicle. The process 500 can then determine an intention of the second vehicle based on the value of the intention model variable (i.e. longitudinal velocity) and the intention models, as will be described below. Calculating the predetermined ego vehicle inputs before the process 500 is executed can save significant time when executing the process 500, as complex calculations can be replaced by a simple lookup instruction. The time saved may allow the predetermined ego vehicle input to be provided to a driving control system at shorter time intervals than if the calculations were performed online, which may allow the process 500 to be executed more safely than otherwise.

At 512, the process 500 can cause the vehicle control system of the ego vehicle to perform a first vehicle maneuver based on the predetermined ego vehicle input. As described above, the predetermined ego vehicle input can be used to determine input values for controlling movement of the ego vehicle. For example, the predetermined ego vehicle input can include a longitudinal acceleration value and a lateral velocity value. As described above, the longitudinal acceleration value and a lateral velocity value can be previously calculated to be optimized to have a minimized maximum input amplitudes, as indicated by $J=\|u_T\|_\infty$ above. Alternatively, the longitudinal acceleration inputs and lateral velocity inputs can be previously calculated to be optimized to have a minimized sum of input amplitudes, as indicated by $J=\|u_T\|_1$. In some embodiments, the predetermined vehicle input can be provided to the vehicle control system directly, provided the vehicle control system is configured to calculate actuator outputs based on the predetermined vehicle input. For example, the process 500 can provide a longitudinal acceleration value and a lateral velocity value to the vehicle control system, which can then control fuel supplied to an engine of the ego vehicle, power supplied to an electric motor of the ego vehicle, positions of front and/or rear wheels of the ego vehicle, positions of one or more brakes of a braking system of the ego vehicle, or other operational parameters of powertrain, braking, and/or steering systems of the ego vehicle via one or more actuators. In some embodiments, the predetermined ego vehicle input can be used to calculate one or more values that are formatted in a manner native to the vehicle control system, which may be optimized to accept acceleration pedal inputs or steering wheel inputs, for example. An acceleration input, which can be formatted as an accelerator pedal position value or throttle input value, can be calculated based on the longitudinal acceleration value and a longitudinal velocity of the ego vehicle, which can be received in 504. Alternatively, a target longitudinal velocity can be calculated based on the longitudinal acceleration value and a longitudinal velocity of the ego vehicle. The acceleration input, the target longitudinal velocity, and/or the steering input value can then be provided to a vehicle control system such as the vehicle control system described in conjunction with FIG. 3. The vehicle control system can then control aspects of the powertrain, braking, and/or steering systems of the ego vehicle as described above. The process 500 can then proceed to 516.

At 516, the process 500 can receive second vehicle information about the second vehicle from a second plurality of sensors coupled to the ego vehicle. The second vehicle information can be used to determine a value for the intention model variable. As mentioned above, the intention model variable can be a longitudinal velocity of the second vehicle. One or more sensors may be able to sense a longitudinal velocity value of the second vehicle and output information about the longitudinal velocity value to the process 500. Alternatively, one or more sensors could be used to sense information about the location of the second vehicle at multiple time points, and the information can be used to calculate a longitudinal velocity value of the second vehicle. The process 500 can then proceed to 520.

At 520, the process 500 can infer an intention of the second vehicle based on the second vehicle information with the aid of a model invalidation algorithm, e.g., Ref. (20). Furthermore, the process 500 can infer the intention using second vehicle information received at multiple time points. For example, if the process 500 has provided three predetermined vehicle inputs to the vehicle control system at three time points, the second vehicle information received after the inputs were provided can be used to infer the intention. As discussed above, the intention model variable has been previously calculated to differ by a predetermined threshold for each intention model. The second vehicle information and/or calculated values based on the second vehicle information can be used with one or more invalidation algorithms, e.g., Ref. (20), to determine the intention model that is consistent with the second vehicle information received. If the second vehicle information is not consistent with only a single model, at least a portion of 504-520 may need to be repeated in order to sense additional second vehicle information. By the design of the inputs that force the intention model variable to differ by a predetermined threshold, an estimation module based on model invalidation is guaranteed to yield only one valid intention by the end of the time horizon of the proposed active model discrimination algorithm. The process 500 can then proceed to 524.

At 524, the process 500 can determine if the intention of the second vehicle has been inferred. If the intention has not been inferred ("NO" at 524), the process 500 can proceed to 504. If the intention has been inferred ("YES" at 524), the process 500 can proceed to 528.

At 528, the process 500 can determine whether or not to perform a vehicle maneuver based on the determined intention. Certain intentions may have been associated with a predetermined vehicle maneuver, while other intentions may allow for a human driver to pilot the ego vehicle without the process 500 overtaking at least a portion of control of the ego vehicle. The process 500 can then proceed to 532.

At 532, if the process 500 determined that a second driving maneuver should be performed ("YES" at 532), the process 500 can then proceed to 536. If the process 500 determined that a second driving maneuver should not be performed ("NO" at 532), the process 500 can then proceed to 540.

At 536, the process 500 can cause the vehicle control system to perform a second vehicle maneuver based on the intention, which has been previously inferred. For example, the process 500 may infer that the second vehicle is moving in accordance with an intention model, such as the malicious intention model, corresponding to a decreasing longitudinal velocity when another vehicle (i.e. the ego vehicle) attempts to merge behind the second vehicle, or an increasing longitudinal velocity of the second vehicle when another vehicle (i.e. the ego vehicle) intends to merge in front of the second vehicle. In a driving scenario such as a lane change scenario that the second vehicle is positioned in a lane that the ego vehicle is attempting to change over to and longitudinally in front of the ego vehicle within the respective lanes of the second vehicle and the ego vehicle, the process 500 may provide inputs to the vehicle control system in order to ensure the ego vehicle is traveling slow enough to stay behind the second vehicle, which is inferred to have an decreasing longitudinal velocity, i.e. is decelerating. As another example, the process 500 may infer that the second vehicle is moving in accordance with an intention model, such as the cautious intention model, corresponding to an increasing longitudinal velocity of the second vehicle to make it easier for other vehicles (i.e. the ego vehicle) to merge behind the second vehicle, or a decreasing longitudinal velocity of the second vehicle to make it easier for other vehicles (i.e. the ego vehicle) to merge in front of the second vehicle. In a driving scenario such as a lane change scenario that the second vehicle is positioned in a lane that the ego vehicle is attempting to change over to and longitudinally in front of the ego vehicle within the respective lanes of the second vehicle and the ego vehicle, the process 500 may provide inputs to the vehicle control system such that the ego vehicle does not have to decelerate excessively in order to merge behind the second vehicle, which is inferred to have an increasing longitudinal velocity, i.e. is speeding up to avoid a potential collision. The process 500 can then proceed to 540.

At 540 the process 500 can cause the ego vehicle to continue traveling on the roadway within predefined safety constraints. In some embodiments, the process 500 may at least temporarily cease providing inputs to the vehicle control system and allow a human driver and/or another process to pilot the ego vehicle along the roadway. In some embodiments, the predefined safety constraints can include a minimum separation distance between the ego vehicle and other vehicles such as the second vehicle and/or a maximum longitudinal velocity to keep the ego vehicle operating within speed limits of the roadway.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIG. 5 can be executed or performed in any order or sequence not limited to the order and sequence shown and described in the figures. Also, some of the above steps of the processes of FIG. 5 can be executed or performed substantially simultaneously where appropriate or in parallel to reduce latency and processing times.

Thus, the invention provides an improved method of determining an intention of a vehicle.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] D. Dadigh, S. S. Sastry, S. Seshia, and A. Dragan. Information gathering actions over human internal state. In I520/RSI IROS, pages 66-73, October 2016.

[2] S. Z. Yong, M. Zhu, and E. Frazzoli. Generalized innovation and inference algorithms for hidden mode switched linear stochastic systems with unknown inputs. In I520 CDC, pages 3388-3394, December 2014.

[3] V. Venkatasubramanian, R. Rengaswamy, K. Yin, and S. Kavuri. A review of process fault detection and diagnosis: Part 1: Quantitative model-based methods. Comp. & Chem. Eng., 27(3):293-311, March 2003.

[4] L. H. Chiang, E. L. Russell, and R. D. Braatz. Fault Detection and Diagnosis in Industrial Systems. Springer-Verlag London, 2001.

[5] H. Lou and P. Si. The distinguishability of linear control systems. Nonlinear Analysis: Hybrid System, 3(1):21-39, November 2009.

[6] S. Cheong and I. R. Manchester. Input design for discrimination between classes of LTI models. Automatica, 53:103-110, March 2015.

[7] R. Nikoukhah and S. Campbell. Auxiliary signal design for active failure detection in uncertain linear systems with a priori information. Automatica, 42(2):219-228, February 2006.

[8] J. K. Scott, R. Findeison, R. D. Braatz, and D. M. Raimondo. Input design for guaranteed fault diagnosis using zonotopes. Automatica, 50(6):1580-1589, June 2014.

[9] Y. Ding, F. Harirchi, S. Z. Yong, E. Jacobsen, and N. Ozay. Optimal input design for affine model discrimination with applications in intention-aware vehicles. In ACM/1520 ICCPS, pages 5161-5167,2018.

[10] D. M. Raimondo, G. R. Marseglia, R. D. Braatz, and J. K. Scott. Closed-loop input design for guaranteed fault diagnosis using set-valued observers. Automatica, 74:107-117, December 2016.

[11] G. R. Marseglia and D. M. Raimondo. Active fault diagnosis: A multi-parametric approach. Automatica, 79:223-230, May 2017. [12] D. Bertsimas and C. Caramanis. Finite adaptability in multistage linear optimization. 1520 Transactions on Automatic Control, 55(12): 2751-2766, 2010.

[13] F. Harirchi, S. Z. Yong, E. Jacobsen, and N. Ozay. Active model discrimination with applications to fraud detection in smart buildings. In IFAC World Congress, 2017.

[14] Gurobi Optimization, Inc. Gurobi optimizer reference manual, 2015.

[15] IBM ILOG CPLEX. V12. 1: User's manual for CPLEX. International Business Machines Corporation, 46(53):157, 2009.

[16] M. Kvasnica, P. Grieder, and M. Baoti'c. Multi-Parametric Toolbox (MPT), 2004.

[17] K. H. Rosen. Discrete Mathematics and Its Applications. New York: McGraw-Hill, 2011.

[18] A. Ben-Tal, L. El Ghaoui, and A. Nemirovski. Robust optimization. Princeton University Press, 2009.

[19] D. Bertsimas, D. B. Brown, and C. Caramanis. Theory and applications of robust optimization. SIAM review, 53(3):464-501, 2011.

[20] F. Harirchi, S. Z. Yong, and N. Ozay. Passive diagnosis of hidden-mode switched affine models with detection guarantees via model invalidation. In Diagnosability, Security and Safety of Hybrid Dynamic and Cyber-Physical Systems, pages 227-251. Springer, 2018.

The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a vehicle monitoring system, the method comprising:

(a) receiving, from at least one of a first plurality of sensors coupled to an ego vehicle, information associated with a parametric variable;
(b) selecting a partition of an operating region of the parametric variable based on the parametric variable information,
the operating region comprising a predetermined range of values of the parametric variable, and the operating region is associated with a plurality of partitions, each of the plurality of partitions comprising a subset of the predetermined range of values,
the partition being one of the plurality of partitions, and being associated with a predetermined ego vehicle input, and
the predetermined ego vehicle input comprising at least one value for a parameter corresponding to dynamics of the ego vehicle;
(c) causing a vehicle control system of the ego vehicle to perform a first maneuver based on the predetermined ego vehicle input;
(d) receiving, from at least one of a second plurality of sensors coupled to the ego vehicle, a first vehicle information about a second vehicle;
(e) inferring an intention of the second vehicle based on the first vehicle information; and
(f) causing the vehicle control system to perform a second maneuver based on the intention,
wherein the predetermined ego vehicle input is calculated to allow an intention of the second vehicle to be inferred from the first vehicle information received after the ego vehicle performs the first maneuver.

2. The method of claim 1, wherein the intention is included in a set of intentions, and wherein each intention in the set of intentions is associated with a second vehicle operating parameter of the second vehicle and a predetermined intention model value of the second vehicle operating parameter, wherein the predetermined intention model value is previously calculated to differ by a predetermined threshold for each intention in the set of intentions.

3. The method of claim 2, wherein the first vehicle information includes information about a second vehicle operating parameter value of the second vehicle operating parameter, and the intention is inferred based on the second vehicle operation parameter value and the predetermined intention model value.

4. The method of claim 3, wherein the second vehicle operating parameter is a longitudinal velocity of the second vehicle.

5. The method of claim 1, wherein the predetermined ego vehicle input has been previously calculated to minimize a maximum input magnitude of the predetermined ego vehicle input.

6. The method of claim 1, wherein the predetermined ego vehicle input belongs to a plurality of predetermined ego vehicle inputs, each predetermined ego vehicle input corresponding a discrete time point included in a series of time points and comprising at least one value, and wherein each predetermined ego vehicle input has been previously calculated to minimize a sum of the values in the plurality of predetermined ego vehicle inputs.

7. The method of claim 1, wherein the predetermined ego vehicle input comprises a longitudinal acceleration value and a lateral velocity value.

8. The method of claim 1 further comprising:
receiving, from the first plurality of sensors, second parametric variable information associated with the parametric variable, the parametric variable information and the second parametric variable information being associated with different discrete time points;
selecting a second partition of the plurality of partitions of the operating region based on the second parametric variable information, the second partition being associated with a second predetermined ego vehicle input; and
causing the vehicle control system to perform a third maneuver based on the second predetermined ego vehicle input.

9. The method of claim 8, wherein the second partition comprises a second subset of the predetermined range of values of the partition, and wherein the second subset is equivalent to the subset of the partition.

10. A method in a data processing system comprising at least one processor and at least one memory, the at least one memory comprising instructions executed by the at least one processor to implement a vehicle monitoring system, the method comprising:
(a) receiving, from a first plurality of sensors coupled to an ego vehicle, parametric variable information associated with a parametric variable;
(b) selecting a predetermined ego vehicle input based on the parametric variable information;
(c) determining, subsequent to receiving the parametric variable information, a first maneuver for the ego vehicle to perform based on the predetermined ego vehicle input,
the predetermined ego vehicle input comprising at least one value for a parameter corresponding to dynamics of the ego vehicle;
(d) causing a vehicle control system of the ego vehicle to perform the first maneuver;
(e) receiving, from a second plurality of sensors coupled to the ego vehicle, second vehicle information about a second vehicle;
(f) inferring an intention of the second vehicle based on the second vehicle information; and
(g) causing the vehicle control system to perform a second maneuver based on the intention,
wherein the predetermined ego vehicle input is calculated to allow an intention of the second vehicle to be inferred from first vehicle information received after the ego vehicle performs the first maneuver.

11. The method of claim 10 further comprising:
receiving, from the first plurality of sensors, second parametric variable information associated with the parametric variable, the parametric variable information and the second parametric variable information being associated with different discrete time points;
selecting a partition of an operating region based on the second parametric variable information, the partition being associated with a second predetermined ego vehicle input; and
causing the vehicle control system to perform a third maneuver based on the second predetermined ego vehicle input.

12. The method of claim 10, wherein the parametric variable is a desired longitudinal velocity value.

13. The method of claim 12 further comprising:
selecting a partition of an operating region of the parametric variable based on the desired longitudinal velocity value, the operating region comprising a predetermined range of values for the parametric variable, and the partition comprising a subset of the predetermined range of values and being associated with a predetermined ego vehicle input.

14. The method of claim 10, wherein the parametric variable is one of a weight of the ego vehicle, a road gradient of a road in contact with the ego vehicle, a friction coefficient of tires coupled to the ego vehicle, a steering input value, or a location of an object located near the road.

15. The method of claim 10, wherein the predetermined ego vehicle input comprises at least one of a predetermined velocity of the ego vehicle and a predetermined position of a pair of front wheels of the ego vehicle.

16. A driving control system for an ego vehicle, the driving control system comprising:
   a first plurality of sensors and a second plurality of sensors, the first and second plurality of sensors being coupled to the ego vehicle, the ego vehicle comprising a vehicle control system; and
   a controller in electrical communication with the first plurality of sensors and the vehicle control system, the controller being configured to execute a program to:
   (i) receive, from at least one of the first plurality of sensors coupled to the ego vehicle, information associated with a parametric variable;
   (ii) select a partition of an operating region of the parametric variable based on the parametric variable information,
      the operating region comprising a predetermined range of values for the parametric variable,
      the partition comprising a subset of the predetermined range of values and being associated with a predetermined ego vehicle input, and
      the predetermined ego vehicle input comprising at least one value for a parameter corresponding to dynamics of the ego vehicle;
   (iii) determine, subsequent to selecting the partition of the operating region, a first maneuver to perform based on the predetermined ego vehicle input;
   (iv) cause a vehicle control system of the ego vehicle to perform the maneuver; and
   (v) receive, from at least one of a second plurality of sensors coupled to the ego vehicle, second vehicle information about a second vehicle;
   (vi) infer an intention of the second vehicle based on the second vehicle information; and
   (vii) cause the vehicle control system to perform a second maneuver based on the intention,
   wherein the predetermined ego vehicle input is calculated to allow an intention of the second vehicle to be inferred from first vehicle information received after the ego vehicle performs the first maneuver.

17. The system of claim 16, wherein the intention is included in a set of intentions, and wherein each intention in the set of intentions is associated with a second vehicle operating parameter, and wherein a second vehicle operating parameter value of the second vehicle operating parameter has been previously calculated to differ by a predetermined threshold for each intention in the set of intentions.

18. The system of claim 16, wherein the controller is further configured to execute the program to:
   receive, from at least one of the first plurality of sensors, second parametric variable information associated with the parametric variable,
      the parametric variable information and the second parametric variable information being associated with different discrete time points;
   select a second partition of the operating region based on the second parametric variable information,
      the partition being associated with a second predetermined ego vehicle input; and
   cause the vehicle control system to perform a third maneuver based on the second predetermined ego vehicle input.

19. The method of claim 1, wherein the predetermined ego vehicle input is calculated to determine the intention of the second vehicle.

20. The system of claim 16, wherein the predetermined ego vehicle input is calculated to determine the intention of the second vehicle, so that, for any possible response of the second vehicle to the first maneuver, only one intention of the second vehicle is valid.

* * * * *